United States Patent
Coleman

(10) Patent No.: US 7,542,635 B2
(45) Date of Patent: Jun. 2, 2009

(54) DUAL ILLUMINATION ANISOTROPIC LIGHT EMITTING DEVICE

(75) Inventor: Zane Coleman, Somerville, MA (US)

(73) Assignee: Fusion Optix Inc., Woburn, MA (US)

( * ) Notice: Subject to any disclaimer, the term of this patent is extended or adjusted under 35 U.S.C. 154(b) by 0 days.

(21) Appl. No.: 11/957,406

(22) Filed: Dec. 14, 2007

(65) Prior Publication Data

US 2008/0094854 A1 Apr. 24, 2008

Related U.S. Application Data

(63) Continuation of application No. 11/282,151, filed on Nov. 17, 2005, now abandoned.

(60) Provisional application No. 60/628,769, filed on Nov. 17, 2004.

(51) Int. Cl.
*G02B 6/26* (2006.01)

(52) U.S. Cl. .......................... 385/31; 385/129; 385/146; 362/600; 362/246; 362/355; 362/623; 362/617; 349/64

(58) Field of Classification Search .................. 385/31, 385/129, 146; 362/617, 600, 246, 355, 623; 349/64
See application file for complete search history.

(56) References Cited

U.S. PATENT DOCUMENTS

| | | | |
|---|---|---|---|
| 5,783,120 A | 7/1998 | Ouderkirk et al. | |
| 5,914,805 A * | 6/1999 | Crowley | 359/296 |
| 5,950,340 A | 9/1999 | Woo | |
| 6,517,914 B1 | 2/2003 | Hiraishi | |
| 7,431,489 B2 * | 10/2008 | Yeo et al. | 362/606 |
| 2003/0002153 A1* | 1/2003 | Hiraishi et al. | 359/452 |
| 2003/0175446 A1 | 9/2003 | Akiyoshi et al. | |
| 2003/0201969 A1* | 10/2003 | Hiyama et al. | 345/102 |
| 2005/0001957 A1 | 1/2005 | Amimori et al. | |
| 2005/0068759 A1* | 3/2005 | Takemoto et al. | 362/31 |
| 2007/0217227 A1* | 9/2007 | Watanabe et al. | 362/615 |
| 2008/0101087 A1* | 5/2008 | Hwang et al. | 362/619 |

FOREIGN PATENT DOCUMENTS

| | | |
|---|---|---|
| EP | 1089114 A2 | 4/2001 |
| EP | 1223460 A2 | 7/2002 |

OTHER PUBLICATIONS

International Search Report and Written Opinion of the International Searching Authority for PCT/US2005/042054.

* cited by examiner

*Primary Examiner*—Ellen Kim

(57) ABSTRACT

An enhanced electroluminescent sign containing a volumetric, anisotropic scattering element to control the angular spread of light from the sign and the spatial luminance uniformity of the sign. The anisotropic scattering element contains one or more regions of asymmetrically-shaped light scattering particles. The angular spread of light leaving a sign from a light emitting source can be efficiently controlled by using a thin, low cost, volumetric, anisotropic scattering elements to angularly and spatially distribute light, permitting the reduction in number of light sources, a reduction in power requirements, or a more tailored viewing angle.

20 Claims, 12 Drawing Sheets

DUAL ILLUMINATION ANISOTROPIC LIGHT EMITTING DEVICE

RELATED APPLICATIONS

This application is a continuation application of U.S. patent application Ser. No. 11/282,151, filed Nov. 17, 2005, now abandoned, the disclosure of which is incorporated by reference in its entirety herein. This application claims the benefit of priority to U.S. Provisional Application No. 60/628,769, filed on Nov. 17, 2004, the entire contents of which is incorporated herein by reference.

FIELD OF THE INVENTION

The invention generally relates to electroluminescent signs or other devices capable of displaying images or indicia wherein light is emitted such that indicia can be visually recognized. The invention also relates to the components contained within the electroluminescent signs or devices.

BACKGROUND OF THE INVENTION

Electroluminescent signs such as neon, traditional fluorescent backlit signs and channel lettering typically direct light into large angles in the horizontal and vertical directions. In many cases, the light does not need to be directed in to certain angular directions because the sign is not normally viewed from that direction. For example, most signs are typically viewed in the horizontal direction with only a slight vertical downward direction needed. The light that is sent high in the vertical direction upward is often wasted and causes significant light pollution. This also increases the running costs of the sign due to the increased electrical power and brighter bulb requirements.

Fluorescent light bulb-based electroluminescent signs are generally rectangular in shape due to the typical long cylindrical shape of the fluorescent bulbs. These signs typically use white reflecting light boxes and symmetrically scattering diffusers to spread the light in all directions. Channel letters often diffuse light into wide angles in the horizontal and vertical directions using symmetric light scattering films or plastic. A significant amount of light is absorbed or directed into unnecessary directions when using these designs.

Improvements in solid state light sources such as light emitting diodes (LEDs) are continuously increasing their efficacy with their luminous output per electrical watt approaching fluorescent sources. LEDs are essentially point light sources, as opposed to the extended light sources of fluorescent bulbs. Thus, the light from an LED can be controlled more effectively (even when multiple LEDs are used) with the proper optical films and materials. Traditional diffusers used with point sources such as LEDs can exhibit speckle. This is typically avoided by using one or more symmetric diffusers, thick diffusing films, white scattering surfaces such as printed white dots or white light box walls. However, these methods inefficiently scatter the light into large angles and undesirable directions.

Current optical films used with electroluminescent signs include symmetrically diffusing films and prismatic films. For example, the 3M Diffuser Films 3635-30 and 3635-70 are reflecting and transmitting diffuser films that transmit 30% and 70% of the incident light, respectively. The light is diffused symmetrically forward (transmitting) or backward (reflecting) through scattering from particles. While some light boxes require a significant amount of the light to be reflected back toward the white light box, these designs scatter light inefficiently into regions where the light is absorbed. The components of the light box, including the white walls and films, absorb a significant amount of the light that is scattered throughout the light box multiple times. Alternatively, more efficient and thinner designs such as edge-lit or waveguide-based electroluminescent signs are sometimes used. Often with edge-lit or waveguide designs, white scattering dots are printed on a waveguide or film coupled to a waveguide. These dots scatter the light symmetrically, and much of the light is scattered into directions where it is not needed (such as the vertical direction in many applications). This results in an inefficient electroluminescent sign.

Prismatic films such as 3M's Optical Lighting Film (OLF) and 3M's Brightness Enhancement Film (BEF) are sometimes used to direct the light in the large angles in one plane back toward the forward direction. For example, the light from a fluorescent bulb-based edge-lit sign has printed dots on the back that scatter the light in symmetrical directions. A diffuser is often added to the top of the waveguide to blend the non-uniformities of the white dots together and scatter the light into larger angles in both directions. BEF film can be placed with the prisms aligned in the horizontal direction to direct some of the light in the large angles in the vertical directions toward the forward direction. The first area of inefficiency is the white dots that scatter a portion of the light back toward the fluorescent bulb, where it leaves the waveguide and is absorbed by the bulb or other components. Secondly, the symmetrically-scattering diffuser scatters the light into large angles where it is unused and also scatters more light backward towards the waveguide where some of it is absorbed. The BEF directs some of the light in one plane, but not all of the light, towards a more forward direction. All of these components and films add to the volume and cost of the sign with the BEF film being expensive to manufacture due to microreplication techniques.

SUMMARY OF THE INVENTION

What is needed is an enhanced electroluminescent sign that efficiently directs light into desired viewing angles that is low cost, has a reduced volume, and is efficient and uniform.

The present invention relates to enhanced electroluminescent signs, e.g. containing a volumetric, anisotropic scattering elements to control the angular spread of light from the sign. The light scattering element contains one or more regions of asymmetrically-shaped light scattering domains. The angular spread of light leaving a sign from a light emitting source can be efficiently controlled by using a thin, low cost, volumetric, anisotropic scattering elements to direct the light in the desired directions. This can permit the reduction in number of light sources, a reduction in power requirements, or a more tailored viewing angle. In one embodiment, the volume of the electroluminescent sign can also be reduced by eliminating the need the thicker prismatic films used for increased brightness. The speckle contrast of a sign can be reduced by using more than one anisotropic light scattering region. When the diffusing element is used in combination with a waveguide to extract light, the light is efficiently coupled out of the waveguide in a thin, planar surface. This diffusive element can be coupled to a reflecting element such that the resulting combination is a light reflecting element with a desired anisotropic light scattering profile that can be used to create an enhanced electroluminescent sign.

By using anisotropic light scattering elements, one can more precisely control the angular spread of light, creating a more optically efficient electroluminescent sign. Additionally, with the trend in industry to the use of point light sources such as LEDs, the problem of increased visible speckle contrast on the sign is an issue. More than one anisotropic scattering element in the path within the sign can reduce this effect. When used in combination with waveguide based signs, the anisotropic light scattering elements can optically couple light from the waveguide more efficiently that printed dots or symmetric diffusers. Thus, more light is directed in the forward direction and horizontal angles. This can reduce the costs, power requirements, speckle and volume while providing a designed angular viewing range.

When used with linear arrays of light sources, the anisotropic diffusing element increases the spatial luminance uniformity by spreading light into larger angles in the direction perpendicular to array while substantially maintaining the angular spread in the direction parallel to the array. The volume of the electroluminescent sign can also be reduced by eliminating the need for thicker prismatic films conventionally used for increased brightness. The speckle contrast and luminance uniformity of a sign can be reduced by using more than one light scattering region. When the anisotropic scattering element is used in combination with a waveguide to extract light, the light is efficiently coupled out of the waveguide in a thin, planar surface. This anisotropic scattering element can be coupled to a reflecting element such that the resulting combination is a light reflecting element with a desired anisotropic light scattering profile that can be used to create an enhanced electroluminescent sign.

DETAILED DESCRIPTION OF THE INVENTION

Figure 1:
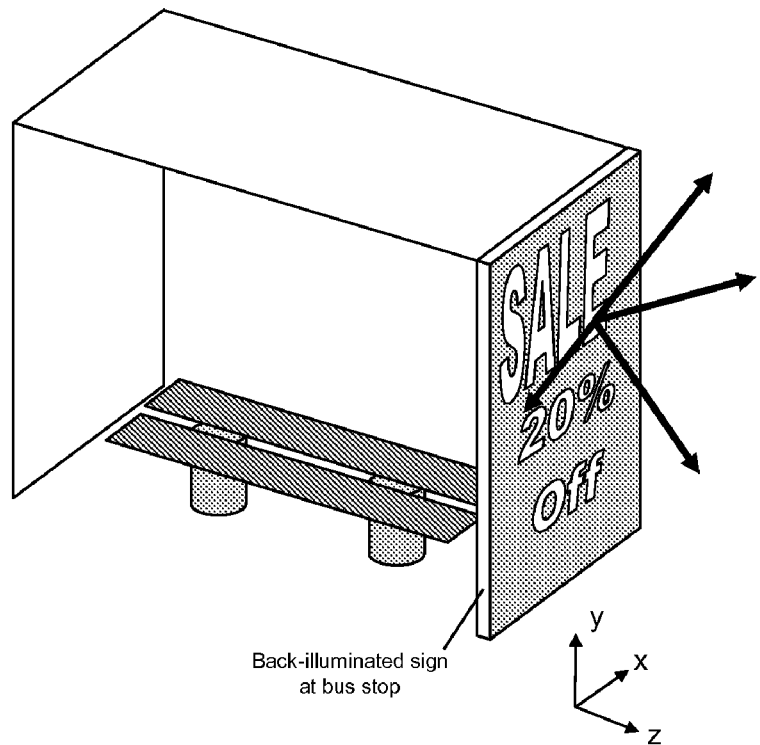
FIG. 1 is a perspective view of a prior art electroluminescent bus-stop sign with a substantially isotropic light output.

The features and other details of the invention will now be more particularly described. It will be understood that particular embodiments described herein are shown by way of illustration and not as limitations of the invention. The principal features of this invention can be employed in various embodiments without departing from the scope of the invention. All parts and percentages are by weight unless otherwise specified.

Definitions

For convenience, certain terms used in the specification and examples are collected here.

"Electroluminescent sign" is defined herein as the means for displaying information wherein the legend, message, image or indicia thereon is formed by or made more apparent by an electrically excitable source of illumination. This includes illuminated cards, transparencies, pictures, printed graphics, fluorescent signs, neon signs, channel letter signs, light box signs, bus-stop signs, illuminated advertising signs, EL (electroluminescent) signs, LED signs, edge-lit signs, advertising displays, liquid crystal displays, electrophoretic displays, point of purchase displays, directional signs, illuminated pictures, and other information display signs. Electroluminescent signs can be self-luminous (emissive), back-illuminated (back-lit), front illuminated (front-lit), edge-illuminated (edge-lit), waveguide-illuminated or other configurations wherein light from a light source is directed through static or dynamic means for creating images or indicia.

"Anisotropic scattering" refers to scattering of incident light into directions such that light has different intensities in different directions. It can also be referred to as asymmetric scattering, and can include the forward and backward directions, horizontal and vertical directions. In general, it refers to unequal scattered light intensities in two or more directions within a solid angle of 4 pi steradians.

"Speckle" includes scintillation or the optical interference pattern visible on a diffusing element.

"Speckle Contrast" is defined herein as the ratio of the standard deviation of the luminance fluctuation to the mean luminance over the area of interest.

"Scatter," "Scattering," "Diffuse," and "diffusing" as defined herein includes redirecting of light by reflection, refraction or diffraction from particles, domains, surfaces, layers or regions.

"Optically coupled" is defined herein as condition wherein two regions or layers are coupled such that the luminance of light passing from one region to the other is not substantially reduced by Fresnel interfacial reflection losses due to differences in refractive indices between the regions. "Optical coupling" methods include methods of coupling wherein the two regions coupled together have similar refractive indices or using an optical adhesive with a refractive index substantially near or in-between the regions or layers. Examples of "Optical coupling" include lamination using an index-matched optical adhesive, coating a region or layer onto another region or layer, or hot lamination using applied pressure to join two or more layers or regions that have substantially close refractive indices. Thermal transferring is another method that can be used to optically couple two regions of material.

A "micro-body", "disperse phase domain," "gaseous void," "particle" as referred to herein are substantially small regions of material or blend of materials. They also include gaseous or void regions defined by the absence of a solid material. The optical effects of light reflecting from, absorbing or passing through these regions may vary and the method of manufacturing these micro-bodies can effect the resulting material and optical characteristics. Methods of manufacturing these types of micro-bodies are known in the art and include, but are not limited to, dispersing materials in a matrix and extruding the blend into a film, blending the micro-bodies within an extruder and extruding a film, injection molding a blend of materials, stretching a blend in conditions where a region is in the solid state such that a void is created, photo-polymerization and monomer diffusion.

A "spherical" or "symmetric" disperse phase domain includes gaseous voids, micro-bodies, or particles that substantially resemble a sphere. A spherical domain may contain surface incongruities and irregularities but has a generally circular cross-section in substantially all directions. A "spheroid" is a type of ellipsoid wherein two of the three axes are equal. An "asymmetric" domain is referred to here as an "ellipsoidal" domain wherein each of the three axis can be a different length. Typically, ellipsoidal domains resemble squashed or stretched spheres. "Non-spherical" domains include ellipsoidal domains and other domains defined by shapes that do not resemble a sphere such as those that not have constant radii. For example, a non-spherical particle may have finger-like extensions within one plane (amoeba-like) and substantially planar in a perpendicular plane. Also, fibrous domains are also non-spherical disperse phase domains that may have aspect ratios of 10:1, 100:1 or larger.

"Light guide" or "waveguide" refers to a region bounded by the condition that light rays traveling at an angle that is larger than the critical angle will reflect and remain within the region. In a light guide, the light will reflect or TIR (totally internally reflect) if the angle ($\alpha$) does not satisfy the condition $$\alpha < \sin^{-1}\left(\frac{n_2}{n_1}\right)$$

where $n_1$ is the refractive index of the medium inside the light guide and $n_2$ is the refractive index of the medium outside the light guide. Typically, $n_2$ is air with a refractive index of $n \approx 1$, however, high and low refractive index materials can be used to achieve light guide regions. The light guide may comprise reflective components such as reflective films, aluminized coatings, surface relief features, and other components that can re-direct or reflect light. The light guide may also contain non-scattering regions such as substrates. Light can be incident on a light guide region from the sides or below and surface relief features or light scattering domains, phases or elements within the region can direct light into larger angles such that it totally internally reflects or into smaller angles such that the light escapes the light guide. The light guide does not need to be optically coupled to all of its components to be considered as a light guide. Light may enter from any face (or interfacial refractive index boundary) of the waveguide region and may totally internally reflect from the same or another refractive index interfacial boundary. A region can be functional as a waveguide for purposes illustrated herein as long as the thickness is larger than the wavelength of light of interest. For example, a light guide may be a 5 micron region with 2 micron×3 micron ellipsoidal dispersed particles or it may be a 3 millimeter diffuser plate with 2.5 micron×70 micron dispersed phase particles.

"Angle of view" (AOV) is a measurement of illumination for all angles relative to two perpendicular axes in the plane of the material. Typically, the X axis references the horizontal, axis and the Y axis references the vertical, axis. The angle of view is measured by applying a "full-width at half maximum" approach, a "full-width at one-third maximum" approach, and a "full-width at one-tenth maximum approach." The AOV at full-width at half maximum ($\alpha(\frac{1}{2})$) is calculated from sum of the absolute value of the angles (measured from an orthogonal to the plane of the material) at which the measured luminance is one-half the maximum luminance measured and noted. For example, if angles of +35° and −35° were measured to have one-half of the maximum luminance in the horizontal direction, the AOV $\alpha(\frac{1}{2})$ in the horizontal direction for the screen would be 70°. The AOV at full-width at one-third maximum ($\beta(\frac{1}{3})$) and the AOV at full-width at one-tenth maximum ($\chi(\frac{1}{10})$) are calculated similarly, except that they are calculated from the angles at which the luminance is one-third and one-tenth of the maximum luminance respectively.

The "asymmetry ratio" or "anisotropy ratio" is the horizontal AOV $\alpha(\frac{1}{2})$ divided by the vertical AOV $\alpha(\frac{1}{2})$, and thus is a measure of the degree of asymmetry between the horizontal luminance and the vertical luminance of the diffuser.

This invention is an enhanced electroluminescent sign containing a volumetric, anisotropic scattering element to control the angular spread of light from the sign. The light scattering element contains one or more regions of asymmetrically-shaped light scattering domains. The spatially uniformity and angular spread of light leaving a sign from a light emitting source can be efficiently controlled by using a thin, low cost, volumetric, anisotropic light scattering elements to direct the light in the desired directions. This can permit the reduction in number of light sources, a reduction in power requirements, or a more tailored viewing angle. The thickness and volume of the electroluminescent sign can also be reduced by eliminated the thicker prismatic films used for increased brightness. The speckle contrast of a sign can be reduced by using more than one anisotropic light scattering region. When the diffusing element is used in combination with a waveguide to extract light, the light is efficiently coupled out of the waveguide in a thin, planar surface. This diffusive element can be coupled to a reflecting element such that the resulting combination is a light reflecting element with a desired asymmetric light scattering profile that can be used to create an enhanced electroluminescent sign.

By using anisotropic light scattering elements, one can more precisely control the angular spread of light, creating a more optically efficient electroluminescent sign. Additionally, with the trend in industry to move toward point light sources such as LEDs, the visible speckle contrast on the sign can increase and the demands on the external optical components are higher (such as more diffusion). This is because of the need to maintain the spatial uniformity due to the nature of moving from extended sources and closer to point sources. More than one anisotropic scattering element in the optical path within the sign can improve the luminance uniformity and reduce the speckle contrast. When used in combination with waveguide based signs, the anisotropic light scattering elements can optically couple light from the waveguide more efficiently that printed dots or symmetric diffusers. Thus, more light is directed in the forward direction and horizontal angles. This can reduce the costs, power requirements, speckle and volume while providing a designed angular viewing range.

One embodiment of this invention of an electroluminescent sign comprises of at least one light emitting source, a first means for displaying a first set of images or indicia and a light transmitting region comprising a first anisotropic scattering region comprising non-spherical dispersed phase domains within a first continuous phase material of a different refractive index wherein the scattering region scatters light toward the means for displaying indicia.

In a further embodiment of this invention, the anisotropic light scattering region is contained within a waveguide region. By using a light guide containing substantially aligned asymmetric particles, more efficient control of the light scattering can be achieved. One or more regions containing asymmetric particles may be used and the particle sizes, shapes, concentration, alignment may vary spatially. The light scattering regions may be substantially orthogonal in their axis of alignment. Alternatively, one or more anisotropic scattering films can be used in combination with a light guide and a reflector to produce an efficient electroluminescent sign. The light guides may be manufactured by extruding, embossing, stamping, or compression molding a light guide in a suitable light guide material containing asymmetric particles substantially aligned in one direction. The light scattering light guide or non-scattering light guide may be used with one or more light sources, collimating films or isotropic or anisotropic scattering films to produce a uniform anisotropic electroluminescent sign with a substantially uniform spatial luminance. By maintaining more control over the scattering, the efficiency of the sign is increased. The concentration of the particles may vary throughout the volume and also the shape of the particles (thus the anisotropic scattering) may vary spatially, such as to achieve higher luminance uniformity in the sign.

The non-spherical particles can be added to the matrix material during processing or they can be created during manufacturing. In one embodiment, particles not substantially asymmetric in shape may be stretched along an axis after coating or during or after an extruding process such that they become asymmetric in shape. Other methods for achieving a single region of non-spherical particles in a region are disclosed in U.S. Pat. No. 5,932,342, the text of which is incorporated herein by reference. By using multiple layers or multi-region methods such as multiple film stacks, co-extrusion, optical lamination, optical coupling, thermal bonding, multiple regions containing light scattering particles can be combined into a single light scattering element. The degree of stretching can control the asymmetry and thus achieve a desired level of anisotropic light scattering. The asymmetric particles may have a large variation in size depending on the desired level of anisotropy. Methods including co-extrusion, laminating, thermally bonding, etc can be used to achieve multiple regions containing dispersed phases with improved optical performance. The dispersed phase material may blended with the continuous phase material in a compounding step, a tumbling mixer, in a solvent blending process, or within an extruder.

In one embodiment of the invention, the asymmetric particles in the anisotropic light scattering element are obtained by reducing particles in size in the x, y or other directions by stretching a film after or during extrusion.

In one embodiment of this invention the disperse domains have a refractive index $n_{p1}$ different from the host matrix material refractive index $n_{m1}$ defined by at least one of $|n_{mx1} - n_{px1}| \geq 0.001$, $|n_{my1} - n_{py1}| \geq 0.001$, or $|n_{mz1} - n_{pz1}| \geq 0.001$ to provide sufficient light scattering. The differential refractive index ($\Delta n_{MP}$) defined as the absolute value of the difference between the index of refraction of the matrix ($n_{M1}$) and the index of refraction of the particles ($n_{P1}$), or $|n_{M1} - n_{P1}|$, may be from about 0.001 to about 0.8, and preferably is from about 0.01 to about 0.2 in the x, y, or z directions.

It is recognized that when a film is stretched that contains solid particles, voids can be created. These can be substantially linear when the film is stretched along one axis. In this case, the disperse phase domains are gaseous (or a vacuum) with a significantly larger refractive index difference between the disperse phase domains and continuous phase material. This increases the scattering and can be used to reduce the concentration (or % volume) of the gaseous phase domains, reduce the thickness of the region, or otherwise improve the optical performance.

When more than one type of non-spherical domains are used within an anisotropic light scattering region, they may have a refractive index $n_{p2}$ in the x, y, or z direction that is the same or different to that of the continuous phase or the dispersed phase refractive index. Alternatively, the matrix phase may have a different refractive index in the x, y, or z directions (birefringent or tri-refringent).

The asymmetric features, e.g., micro-bodies, typically are all oriented with their major axes substantially in one direction in the plane of the surface of the material. Desirably, the particles are made from a material which is capable of being deformed at a processing temperature in order to create their non-spherical shape by stretching. The shape may resemble a non-spherical ellipsoid or shapes that have non-constant radii in the x, y, or z direction may also be formed. For example, the domains may appear randomly shaped in one plane (amoeba-like) and substantially planar in a perpendicular plane. Further, the volume density of the particle, the average size and shape, and the index of refraction in the x, y, and z directions may be optimized to control desired properties of the light scattering region.

The average dimension of a dispersed domain or particle in the x, y, or z direction in the matrix may be from about 1 μm to about 30 μm, preferably from about 2 μm to about 15 μm, and most preferably from about 2 μm to about 5 μm in the minor dimension.

The average dimension of a dispersed domain or particle in the x, y, or z direction in the matrix may be from about 2 μm to about 2 cm, preferably from about 5 μm to about 1 cm, and most preferably from about 10 μm to about 500 μm in the major dimension.

Solid dispersed phase domains in particulate form include suitable materials such as acrylics, polymethylacrylates; polystyrenes; polyethylenes; polypropylenes; organic acid cellulose esters such as cellulose acetate butyrates, cellulose acetates, and cellulose acetate propionates; polycarbonates; or silicones. The particles may also contain coatings of higher or lower refractive index materials. In a preferred embodiment, polyethylene may be used.

Other suitable materials for the transmissive micro-bodies include those that are not deformed during the extrusion or manufacturing process. These include spherical or non-spherical materials that have fibrous, plate-like or other orientable shapes. These include inorganic fibrous material, glass fibers, mica, silica, cross-linked polymers, plate-like materials, fibrous polymer materials with high melting points or high glass transition temperatures. The micro-bodies may be aligned during the manufacturing process, such as alignment due to stretching or extruding the region containing the dispersed micro-bodies.

The light transmitting region of the electroluminescent sign may also contain a light re-directing feature to re-direct a portion of the light into specific angular ranges. Typically, these are surface relief structures on one or more surfaces of the material. An asymmetric surface relief structure can be manufactured by techniques as described above, e.g. embossing. The surface relief desirably contains asymmetrically-shaped features predominantly aligned in the horizontal or vertical directions such that they refract, diffract, scatter, diffuse the incident light in the horizontal or vertical directions.

The surface relief structure of the light transmitting region may help reflect, diffract, refract, or scatter light into a light guide. Alternatively, the surface relief structure of the light guide may collimate light (bring light at high angles toward smaller angles towards the normal to the exit face of the sign or display, for example).

By using a vertically-oriented prismatic array as the surface relief structure a significant amount of light can be directed into angles closer to the sign normal (more collimated). In one embodiment, the asymmetric micro-bodies are oriented horizontally (i.e., perpendicular to the prisms) so the scattering is substantially in the vertical direction (i.e., parallel to the prisms).

The alignment of the asymmetric micro-bodies can also vary. By aligning the particles with respect to the prismatic structure at angles other than parallel or perpendicular, other anisotropic light output profiles can be achieved. The asymmetric micro-bodies will inevitably cause some scattering in the minor axis. This may be designed to be very small, or significant in order to achieve a desired angular light output or luminance uniformity. In one embodiment, the scattering in the minor axis is chosen to be just sufficient to diffuse the specular component of the light source in the plane perpendicular to major axis of the prismatic structure.

Multiple-element light scattering components within the electroluminescent sign in accordance with the invention are desirably optically coupled to one another, i.e., so the luminance of light passing from one region to the other is not substantially reduced due to Fresnel interfacial reflection losses due to differences in refractive indices between the regions. Optical coupling methods includes, but is not limited to, joining two regions having similar refractive indices, or by using an optical adhesive with a refractive index substantially near or in-between the elements or layers.

Particles that are significantly smaller than the wavelength of light may be added to alter the effective refractive index of the continuous or disperse phase domains. In one embodiment, the size of the particles are less than $1/10^{th}$ the wavelength of light. In a preferred embodiment, the size of the particles are less than $1/20^{th}$ the wavelength of light of interest such that significant additional scattering (forward or backward) does not take place. These particles may be symmetric, asymmetric, or random in shape. For example, very fine particles of titanium dioxide may be added to a material to increase the effective refractive index of the material. The effective refractive index change can adjust the scattering properties of the material, refractive properties, and the interfacial reflections.

The diffusers or light scattering elements of the invention may also include an optional hardcoat to increase the scratch resistance of the element, and/or an optional anti-reflective coating. The hardcoat may be any light-transmissive support layer, such as a siloxane-based polymer layer. Anti-blocking, UV absorbing, anti-static and other coatings suitable for use with optical films or materials used in electroluminescent signs may also be used.

FIG. 1 is a perspective view of a typical prior art electroluminescent sign used at a bus stop. The light from the back-illuminated sign passes through a graphic displaying the text "SALE." The light exiting the sign is directed in the +z direction with a range of angles in the +x, −x, +y, and −y directions. A significant amount of light traveling in the +y direction is wasted because the light is not normally seen from that direction. Likewise, a significant amount of light directed in the −y direction where it can not be seen.

Figure 2:
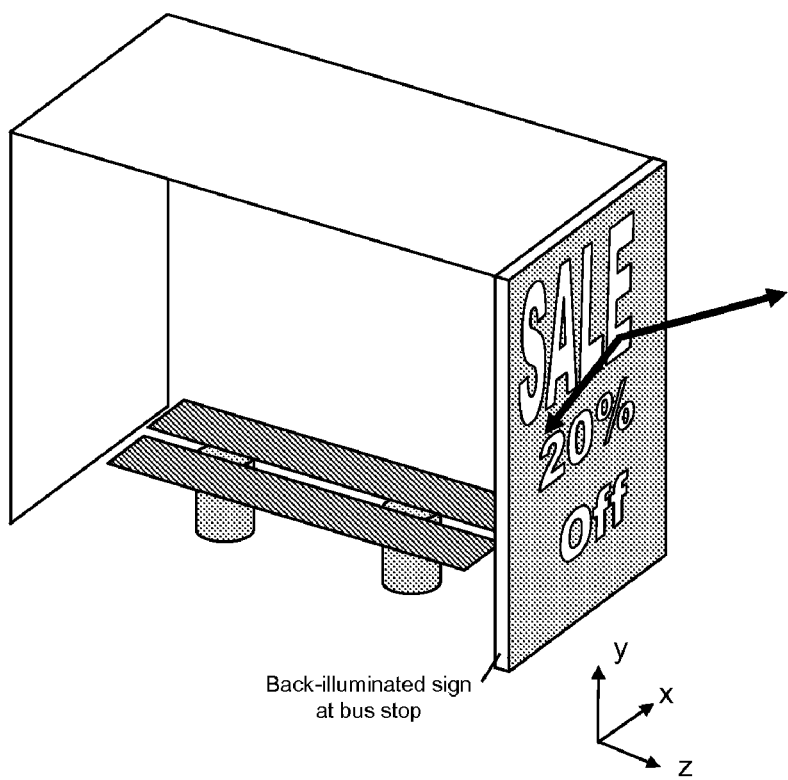
FIG. 2 is a perspective view of an enhanced electroluminescent bus stop sign with a substantially anisotropic light output.

FIG. 2 is a perspective view of an enhanced electroluminescent sign used at a bus stop. The light from the back illuminated sign exits the sign predominantly in the +x and −x directions with significantly less light in the +y and −y directions. This anisotropic light scattering is achieved by using a volumetric diffusing element with asymmetrically-shaped particles. The asymmetrically-shaped particles substantially scatter light in one direction (x direction) more than another (y direction).

Figure 3:
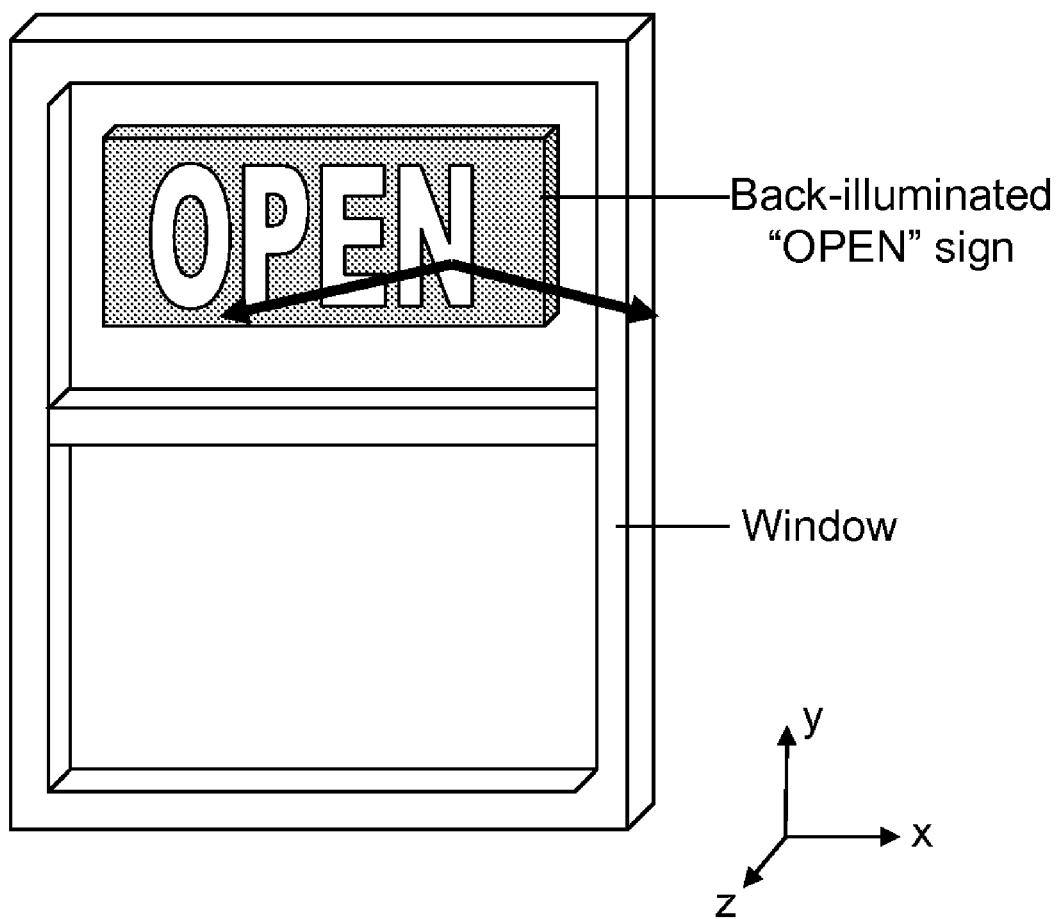
FIG. 3 is a perspective view of an enhanced electroluminescent window sign with a substantially anisotropic light output.

FIG. 3 is a perspective view of a further embodiment of an enhanced electroluminescent sign used as an "OPEN" sign. The light from the sign is predominantly directed in the +z, and x directions. These types of signs are typically placed at eye level and thus very little light needs to be directed into the +y and −y directions. While some light is scattered in the y directions to accommodate for different viewer heights for example, most of the light can be directed into the x directions. This is often quantified by measuring the Full-Width-at-Half-Maximum (FWHM) of the light luminance versus angle curve for a specific location. In the embodiment as described in FIG. 3, the FWHM as measured in the x direction will be larger than the FWHM in the y direction.

Figure 4:
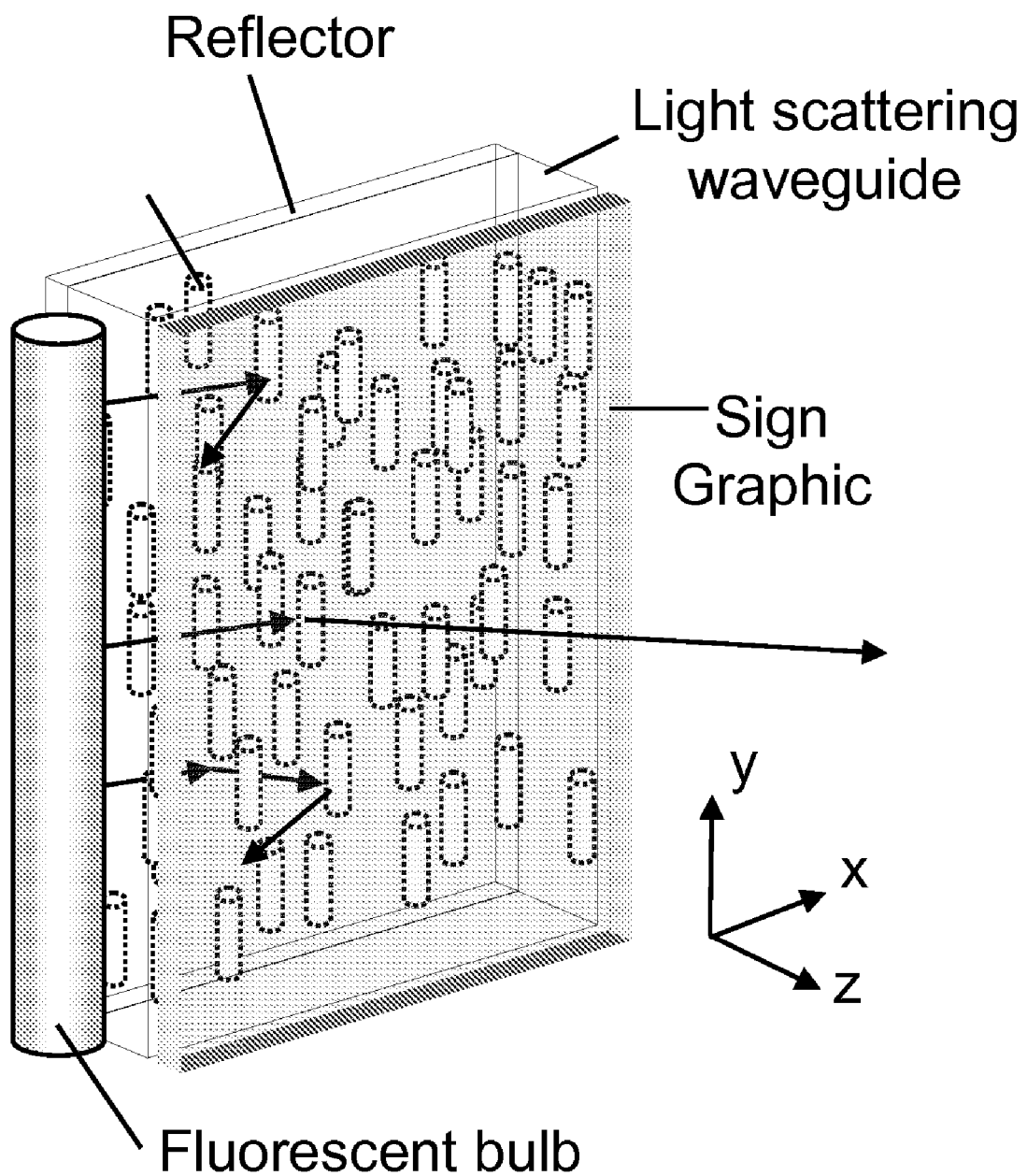
FIG. 4 is a perspective view of an enhanced electroluminescent sign using a volumetric, anisotropic scattering waveguide in combination with a reflector and fluorescent bulb.

FIG. 4 is a perspective view of another embodiment of an enhanced electroluminescent sign utilizing a light scattering waveguide. The waveguide of the sign is a volumetric, anisotropic scattering element that scatters light out of one of its faces toward a sign graphic such as a colored transparency. The asymmetric particles in the volumetric, anisotropic scattering waveguide are oriented in the y direction and are parallel to the linear fluorescent bulb. Light scattering from the asymmetric particles are substantially directed in the x and z directions. The light that is scattered in the −z direction reflects off of the reflector the +z direction and can escape the waveguide. A portion of the light that is scattered in the +z direction will directly be coupled out of the waveguide toward the sign graphic. The volumetric diffuse waveguide has a low level of backscatter, resulting in less light directed back toward the bulb where it can be lost. There is less scatter in the y direction due to the asymmetry in the particles. Thus, light is not scattered toward the sides where it could escape or be directed back into the waveguide at an angle that could ultimately cause the light to be directed back toward the source and be absorbed. Since the light bulb is a substantially linear source aligned in the y direction, one does not need to scatter as much light in the y direction. Light scattered in the y direction would not be used efficiently in many sign applications. More than one light source at one or more edges may also be used. One or more of the sides or light sources may utilize a reflector to increase efficiency. Typically, an air gap is located between the waveguide and the sign graphic such that the light satisfying the waveguide condition is not unnecessarily absorbed. Other light scattering (symmetric or asymmetric) or refracting elements may be optically coupled to or positioned near the exit surface to provide additional directing or scattering of the light. The concentration of the light scattering particles can vary volumetrically or spatially in a plane in order to create a more uniform output luminance distribution.

Figure 5:
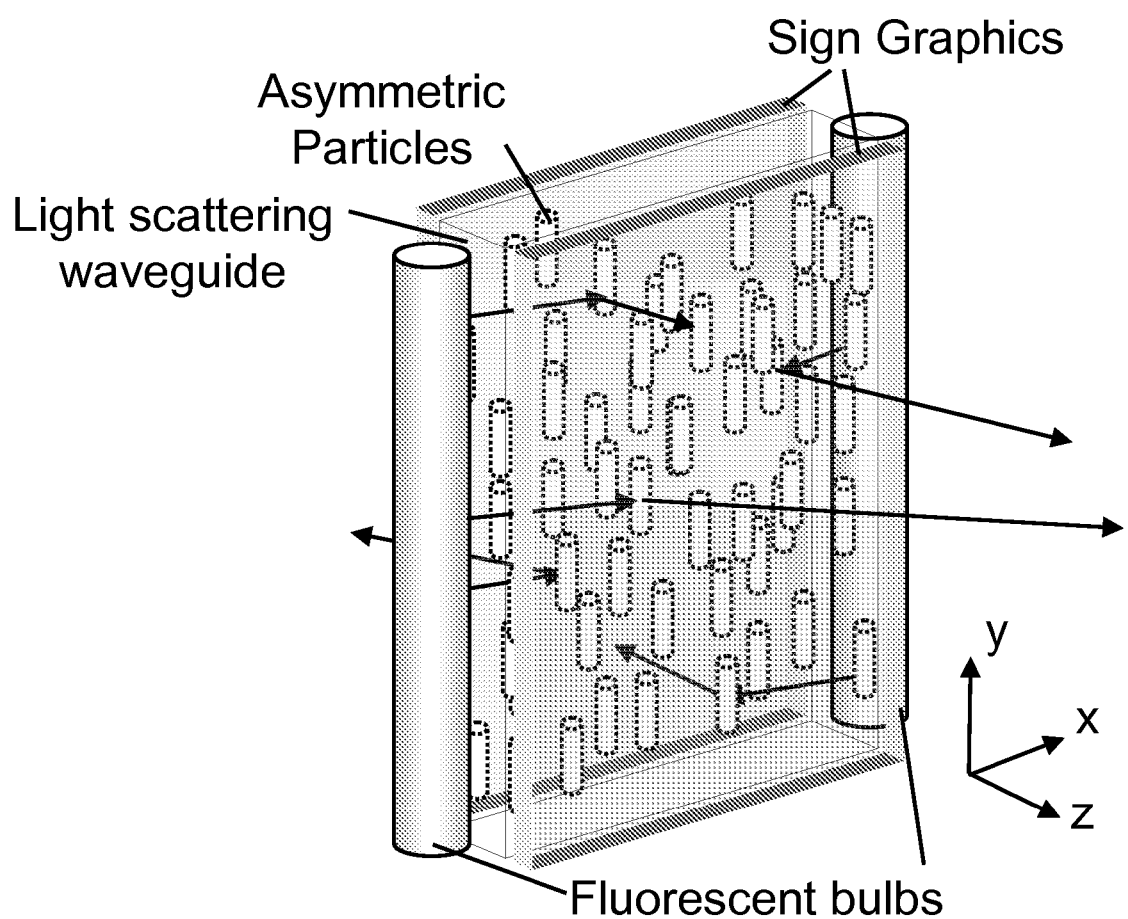
FIG. 5 is a perspective view of an enhanced dual-sided electroluminescent sign using a volumetric, anisotropic scattering waveguide in combination with two fluorescent bulbs.

FIG. 5 is a perspective view of an embodiment of an enhanced electroluminescent sign viewable from opposite sides utilizing an anisotropic light scattering waveguide. The sign emits light from two opposite faces of a volumetric, anisotropic scattering waveguide before passing through the two sign graphics. The asymmetric particles in the volumetric, asymmetrically diffusing waveguide are oriented in the y direction and are parallel to the two linear fluorescent bulbs. Light scattering from the asymmetric particles will be substantially directed in the x and z directions out of the waveguide if the waveguide condition is not met.

Figure 6:
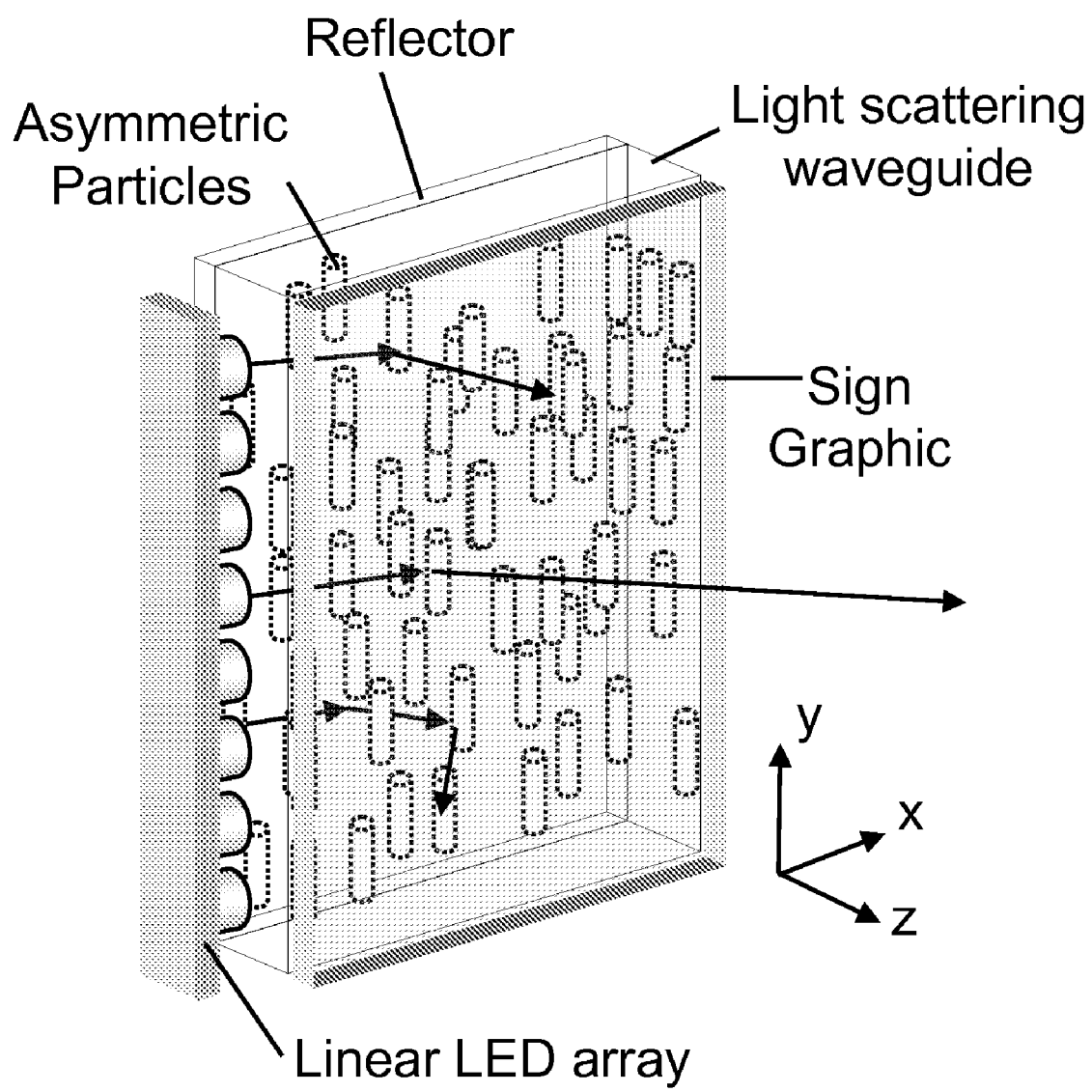
FIG. 6 is a perspective view of an enhanced electroluminescent sign using a volumetric, anisotropic scattering waveguide in combination with a reflector and a linear array of LEDs.

FIG. 6 is a perspective view of an enhanced electroluminescent sign utilizing LEDs as the light source. A volumetric, anisotropic scattering waveguide is optically coupled to a reflector. The asymmetric particles in the scattering region are oriented in the y direction and the linear array of LEDs is aligned in the y direction. The light from the LEDs is coupled into the waveguide through one edge. Light from the LEDs is reflected by the reflector and totally internally reflects within the light scattering region when the waveguide condition is satisfied. A portion of the light that is scattered from the asymmetric particles is coupled out of the waveguide and through the air gap and sign graphic into the +z and x directions. The light that is scattered in the −z direction will reflect off of the reflector and be directed in the +z direction. A portion of the light that is scattered in the +z direction will directly be coupled out of the waveguide if the waveguide condition is not satisfied. The volumetric light scattering region has low level of backscatter, thus less light is directed toward back toward the light source where it may be absorbed. There is less scatter in the y direction due to the asymmetry in the particles. As a result, less light is scattered toward the edges where it could escape or be directed back into the waveguide at an angle that could ultimately cause the light to be directed back toward the source and be absorbed. More than one array of LEDs may be used in two or more edges. Single LED sources may also be used depending on the desired brightness and size of the sign. Arrays of light sources other than LEDs may be used. More than one array of light sources may be utilized to increase the brightness or uniformity. The arrays may be of predominantly one color (white for example) or they may be of multiple colors (red, green, and blue for example). In the cases where the LED's are not of the same color, increased color uniformity may be achieved by the use of one or more anisotropic light scattering regions. In a one embodiment of this invention, an anisotropic light scattering region is disposed in a light transmitting region located between one or more of the light sources and an input surface of a region capable of supporting a waveguide. The anisotropic region scatters light from the different colored sources such that the perceived color is the summation of the diffuse contributions from the sources. One or more of the sides and light sources may utilize a reflector to increase efficiency. Other scattering (symmetric or asymmetric) or refracting elements may be optically coupled to or positioned near the entrance or exit surface to provide additional directing or scattering of the light. Reflective components including reflective films and reflectors can be positioned around the light sources, or at one of the surfaces or edges.

Figure 7:
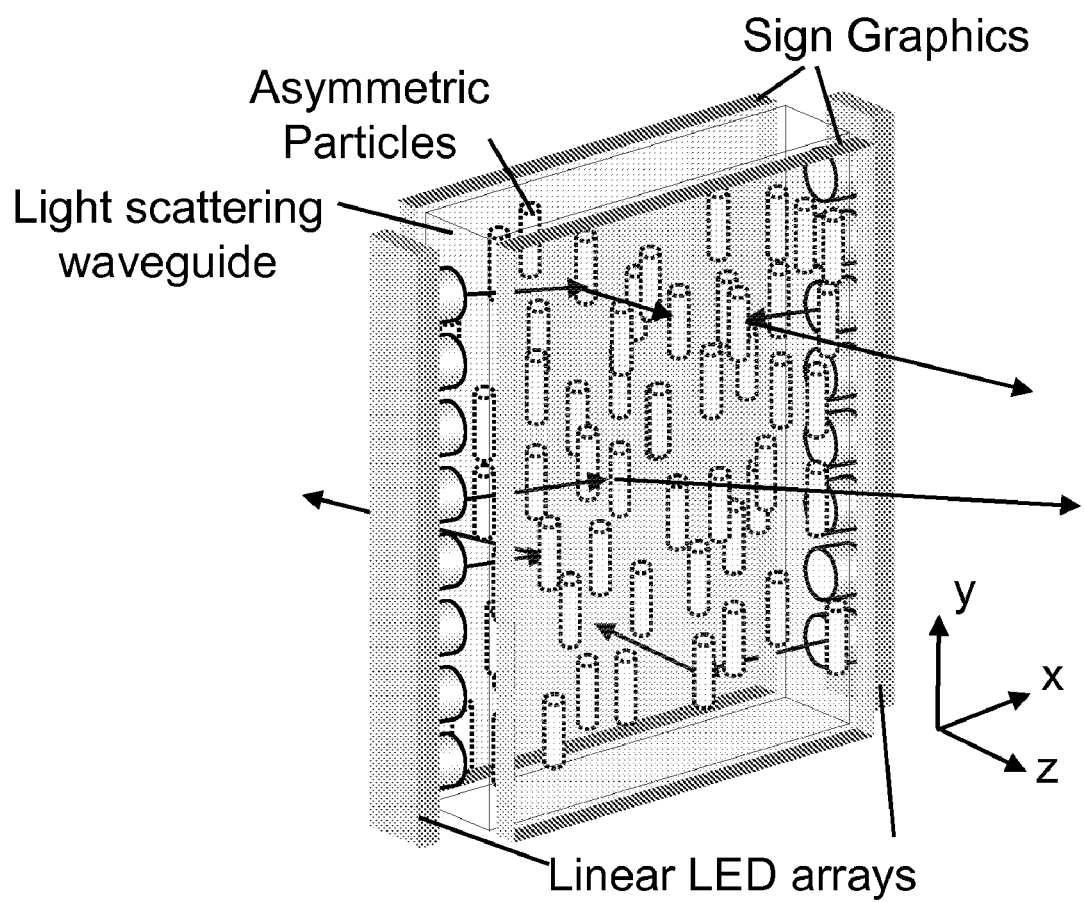
FIG. 7 is a perspective view of an enhanced electroluminescent dual-sided sign using a volumetric, anisotropic scattering waveguide in combination with two linear arrays of LEDs.

FIG. 7 is a perspective view of further embodiment of an enhanced electroluminescent sign visible from opposite sides utilizing two linear arrays of LEDs and a volumetric, anisotropic scattering waveguide. The asymmetric particles in the scattering region are oriented in the y direction and the linear array of LEDs is aligned in the y direction. The light from the LED arrays is coupled into the waveguide through the edges. Light from the LEDs is totally internally reflected within the light scattering region when the waveguide condition is satisfied. A portion of the light that is scattered from the asymmetric particles is coupled out of the waveguide and through the air gap and sign graphic into the z and x directions. A portion of the light that is scattered in the z direction will directly be coupled out of the waveguide if the waveguide condition is not satisfied. The volumetric light scattering region has low level of backscatter, thus less light is directed toward back toward the light source where it may be absorbed. There is less scatter in the y direction due to the asymmetry in the particles. As a result, less light is scattered toward the sides where it could escape or be directed back into the waveguide at an angle that could ultimately cause the light to be directed back toward the source and be absorbed. By using two linear LED arrays, a compact, high brightness electroluminescent sign efficiently scatters the light in the x and z directions. The sign can be thinner than signs using prismatic films before the sign graphic to reduce the angles of diffusion along one axis. Single LED sources may also be used depending on the desired brightness and size of the sign. Arrays of light sources other than LEDs may be used. One or more of the sides and light sources may utilize a reflector to increase efficiency. Other scattering (symmetric or asymmetric) or refracting elements may be optically coupled to or positioned near the entrance, edges, or exit surface to provide additional directing or scattering of the light. The sign graphics may be designed to reflect light back into the waveguide in the regions corresponding to the darker areas of the graphic to improve light efficiency.

Figure 8:
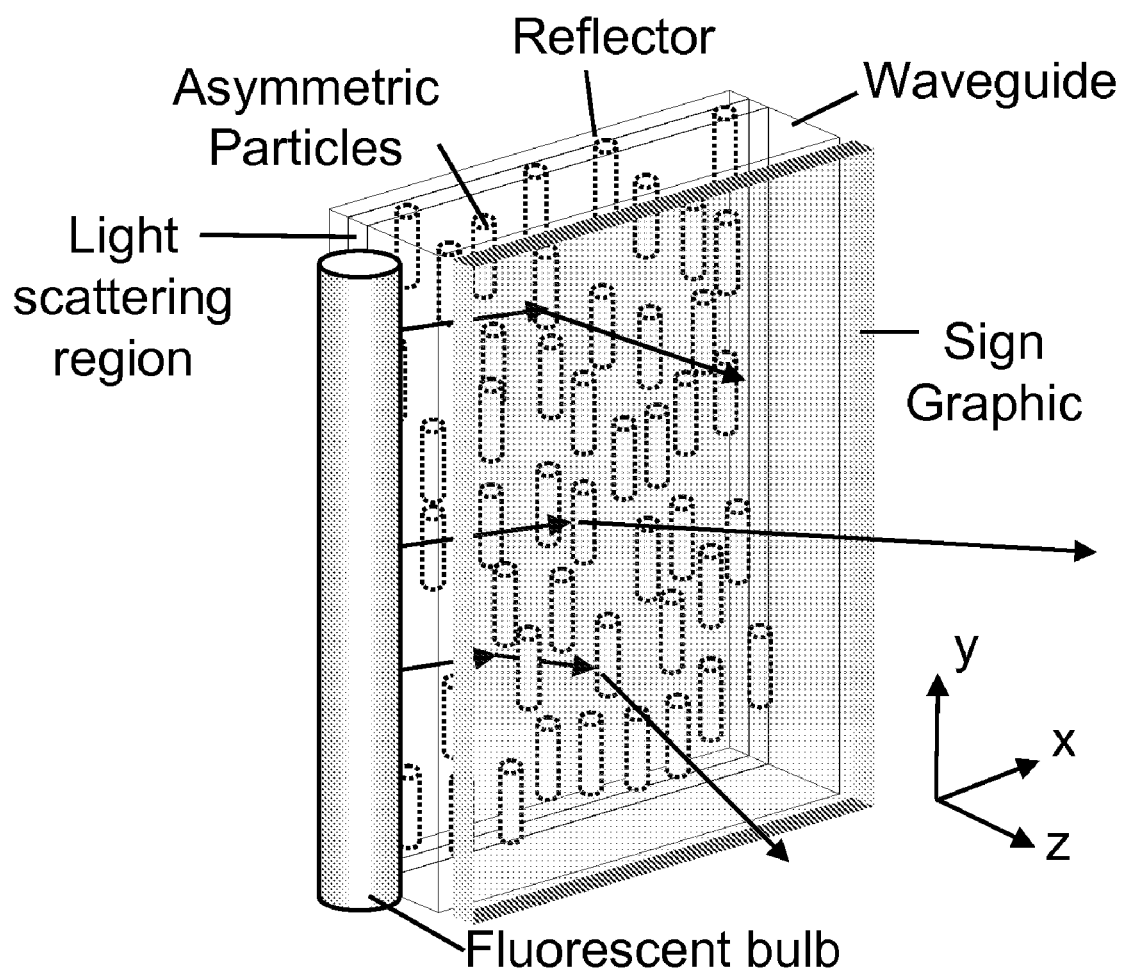
FIG. 8 is a perspective view of an enhanced electroluminescent sign using a volumetric, anisotropic scattering region in combination with a waveguide, reflector, and fluorescent bulb.

FIG. 8 is a perspective view of another embodiment of an enhanced electroluminescent sign wherein a volumetric, asymmetrically scattering region is optically coupled to a waveguide and a reflector in a sign. A sign graphic is spaced from the waveguide by an air gap. The asymmetric particles in the scattering region are oriented in the y direction. A thin, asymmetric diffuser coupled to a reflector allows the use of traditional transparent substrates for the waveguide and can reduce costs. The light from the fluorescent bulb is coupled into the waveguide through one edge. Light from the fluorescent bulb is reflected by the reflector and totally internally reflects within the waveguide when the waveguide condition is satisfied. Light that is scattered from the asymmetric particles can be coupled out of the waveguide into the +z and x directions. The light that is scattered in the −z direction can reflect off of the reflector back into the +z direction where it can be scattered again, escape the waveguide, or reflect off a reflector or other surface if the waveguide condition is satisfied. A portion of the light that is scattered in the +z direction will directly be coupled out of the waveguide. The light traveling in the y direction, or with some component thereof, that is coupled into the waveguide and exits the waveguide is not substantially scattered further by the particles in the y direction such that the angular spread of light in the y direction is increased.

Figure 9:
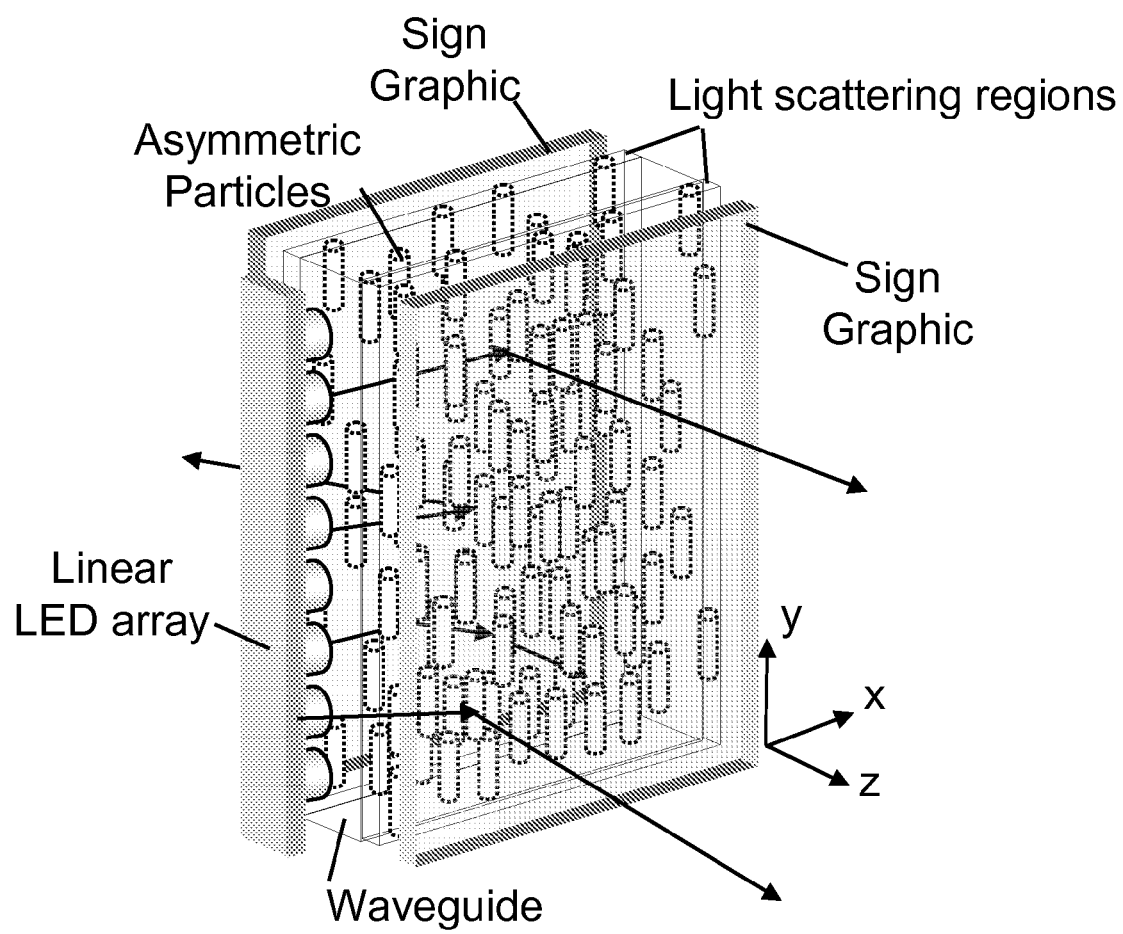
FIG. 9 is a perspective view of an enhanced electroluminescent dual-sided sign using two volumetric, anisotropic scattering regions in combination with a waveguide and a linear array of LEDs.

FIG. 9 is a perspective view of further embodiment of an enhanced electroluminescent sign viewable from opposite sides wherein two volumetric, anisotropic scattering regions are optically coupled to a waveguide. By using two volumetric, anisotropic scattering elements spaced apart by the waveguide, the uniformity of the light scattering out of the sign is increased and the speckle contrast is reduced. The sign graphics are spaced from the waveguide by air gaps in order to maintain a waveguide. The asymmetric particles in the scattering regions are oriented in the y direction. Thin, anisotropic diffusers coupled to the waveguide scatter light efficiently out of the waveguide and through the sign graphics. The light from the linear array of LEDs is coupled into the waveguide through one edge. One or more anisotropic light scattering diffuser may be used in front of the linear array of LEDs or coupled to the edge of the waveguide in order to make spatial luminance of the light entering the waveguide more uniform in the y direction. Light from the LEDs totally internally reflects within the waveguide when the waveguide condition is satisfied. Light that is scattered from the asymmetric particles can be coupled out of the waveguide into the z and x directions. A portion of the light that is scattered in the z direction will directly be coupled out of the waveguide. The two volumetric, anisotropic scattering elements can also be used on opposite sides of a waveguide for a sign viewable on one side by using a reflector on one side.

Figure 10:
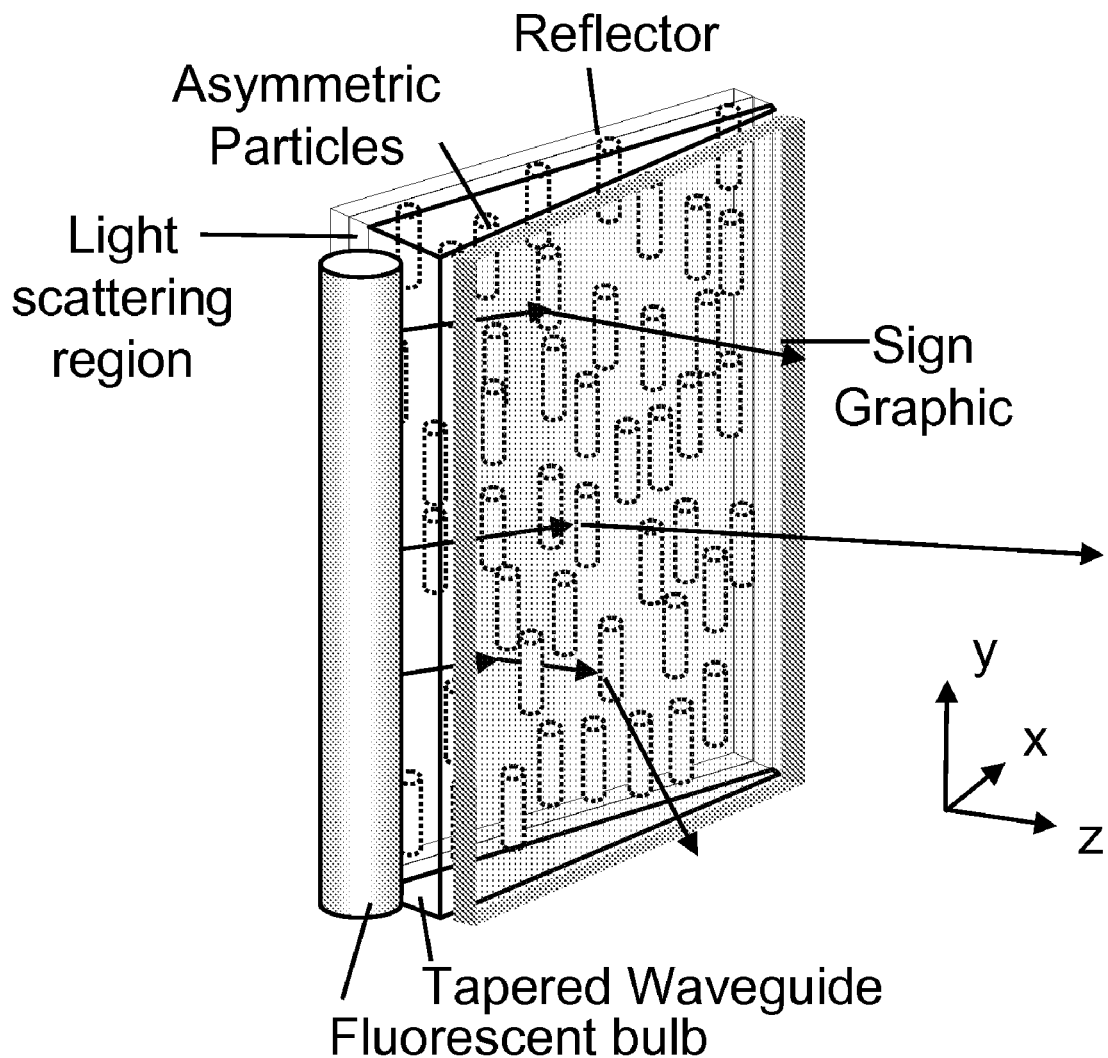
FIG. 10 is a perspective view of an enhanced electroluminescent sign using a volumetric, anisotropic scattering region in combination with a tapered waveguide, reflector, and fluorescent bulb.

FIG. 10 illustrates a perspective view of another embodiment of an enhanced electroluminescent sign wherein a volumetric, asymmetrically scattering region is optically coupled to a tapered waveguide and a reflector. The asymmetric particles in the scattering region are oriented in the y direction. The light from the fluorescent bulb is coupled into the waveguide through one edge. Light from the fluorescent bulb is reflected by the reflector and totally internally reflects within the waveguide when the waveguide condition is satisfied. By using a tapered waveguide, more of the light can escape in the regions further from the fluorescent bulb. Light that is scattered from the asymmetric particles can be coupled out of the waveguide into the +z and x directions passing through an air gap and a sign graphic before reaching a viewer. The light that is scattered in the −z direction can reflect off of the reflector back into the +z direction where it can be scattered again, escape the waveguide, or reflect off a reflector or other surface if the waveguide condition is satisfied. A portion of the light that is scattered in the +z direction will directly be coupled out of the waveguide and pass through the sign graphic.

Figure 11:
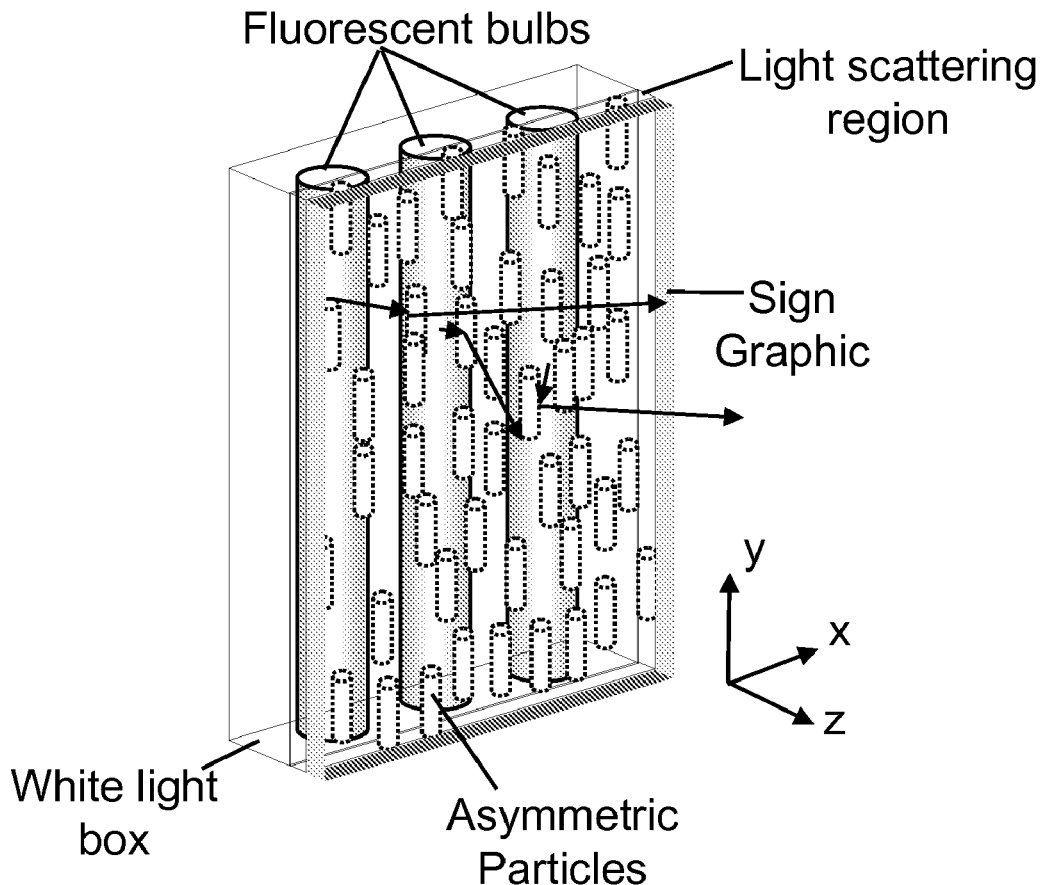
FIG. 11 is a perspective view of an enhanced electroluminescent sign using a volumetric, anisotropic scattering region in combination with fluorescent bulbs in a white light box.

FIG. 11 is a perspective view of an embodiment of an enhanced electroluminescent sign wherein a volumetric, anisotropic scattering region is located between linear fluorescent bulbs and a sign graphic. The electroluminescent sign illustrated in FIG. 11 may be scaled to that shown in FIG. 2. The fluorescent bulbs are located in a white light scattering light box. The asymmetric particles in the scattering region are oriented in the y direction. Light reaching these particles is scattered into the +z and x directions passing through an air gap and a sign graphic before reaching a viewer. The light from the fluorescent bulbs that directly reaches the light box region is reflectively scattered in all directions. This light escapes the light box and travels through the sign in large angles in the horizontal and vertical directions. The uniformity and spread of the light from the light box is increased the horizontal direction by the anisotropic scattering region. The light from the fluorescent bulbs that directly reaches the light scattering region is spread in the horizontal direction to improve the light uniformity in the horizontal direction. Additional isotropic or anisotropic light scattering elements may be used between the first light scattering element and the output surface of the sign. With parallel fluorescent bulbs, often linear "hot spots" are seen through traditional signs. With this enhanced sign, some of the light corresponding to "hot spots" of the bulbs is directed to larger angles in the horizontal direction so the sign has a more uniform luminance and reduced visibility of "hot spots." The light in these hot spot regions is substantially spread into high angles in the x-z plane. If a second light scattering element is utilized, the spatial uniformity of the sign is increased significantly without less scattering in the y-z plane. A reflective light box using walls made of a reflector such as aluminized Mylar from DuPont and volumetric anisotropic diffusers may also be used to increase the uniformity of the light profile and reduce speckle. The concentration (percent of volume) of the particles may vary spatially within the volume of waveguide or a thin film. In the example shown in FIG. 11, the regions of the light scattering region corresponding to the region directly in front of the fluorescent bulbs could contain a higher concentration of particles. In this configuration, more light from the linear "hot spots" may be directed into larger angles and the uniformity may be increased. An additional light scattering region would also improve the spatial luminance uniformity and the concentration of dispersed domains may be uniform or vary spatially.

Figure 12:
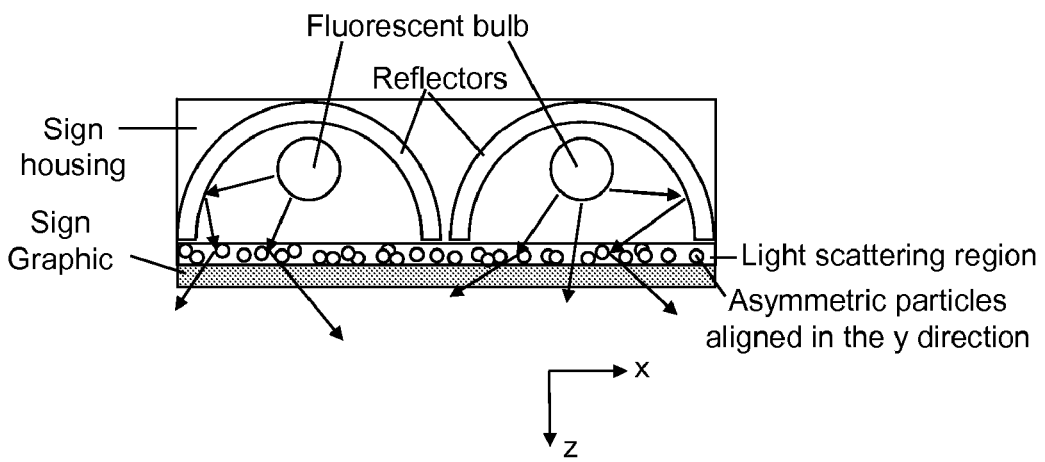
FIG. 12 is a schematic cross-sectional view of an enhanced electroluminescent sign using a volumetric, anisotropic scattering region in combination with fluorescent bulbs with curved reflectors.

FIG. 12 is a schematic cross-sectional side view of an enhanced electroluminescent sign utilizing fluorescent bulbs and reflectors and a volumetric anisotropic diffuser. The reflectors are positioned behind the bulbs such that the light is collected and reflected toward the anisotropic diffuser and sign graphic. The asymmetric particles in the diffuser are aligned in the y direction. Direct light and light from the reflectors is scattered in the +z and x directions. The asymmetric diffuser efficiently scatters light in the x direction. The diffuser may be aligned horizontal such that the sign scatters most of the light in the horizontal direction with substantially less scattering in the vertical direction. The asymmetric diffuser will also reduce the appearance of the "hot spots" or bright lines directly in front of the linear fluorescent bulbs by scattering the light strongly in the x direction. Volumetric asymmetric diffusers may also be laminated or in close contact with the reflectors to increase the uniformity of the light profile and reduce speckle. Additional isotropic or anisotropic light scattering diffusers or refractive elements may be disposed between the light source and the output surface of the electroluminescent sign. These light scattering elements may be separated by thick or thin non-scattering regions to improve the luminance uniformity and reduce speckle contrast. The non-scattering regions may be a material or they may be air gaps.

Figure 13:
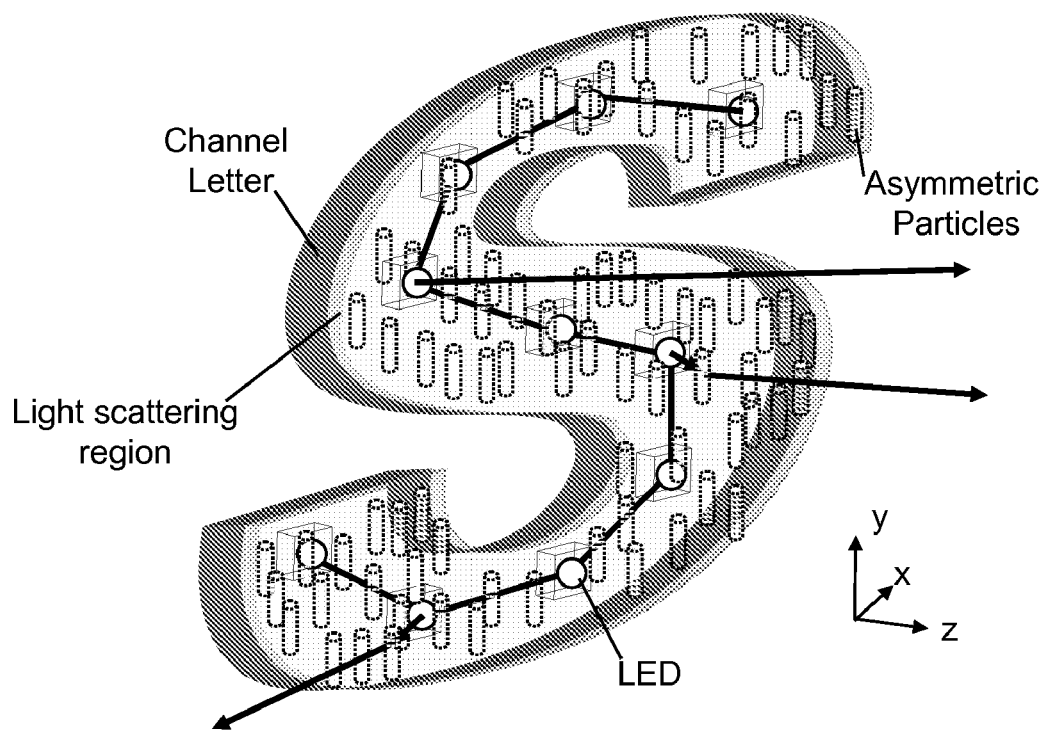
FIG. 13 is a perspective view of an enhanced electroluminescent channel letter sign using a volumetric, anisotropic scattering region in combination with a reflective channel letter housing and multiple LEDs.

FIG. 13 is a perspective view of an embodiment of an enhanced electroluminescent sign in the form of channel letters wherein a volumetric, anisotropic scattering region is optically coupled to a channel letter using LEDs. Channel letters are typically applied on elevated regions of buildings and the light is typically scattered in all directions including upwards. By using a volumetric, asymmetric light scattering region between the light source and the exit face of the channel letter, the light can be efficiently spread into large angles in the x direction (horizontal) and smaller angles in the y direction (vertical). Other light sources such as neon, fluorescent, incandescent lamps may be used as the light source. The channel typically reflects the light from the light source.

Additional light reflecting regions or films may be used in combination or within the anisotropic diffuser to increase the luminance uniformity of the channel letter. For example, an additional symmetric or asymmetric diffuser may be used in the channel letter to increase the angular spread of light and create the appearance of an extended source. This diffuser may be located on the walls or back surface of the channel letter or in front of or behind an anisotropic diffuser. Light reflecting (or scattering) particles such as titania may be added to the asymmetric diffuser to reflect some of the light back into the channel region.

Figure 14:
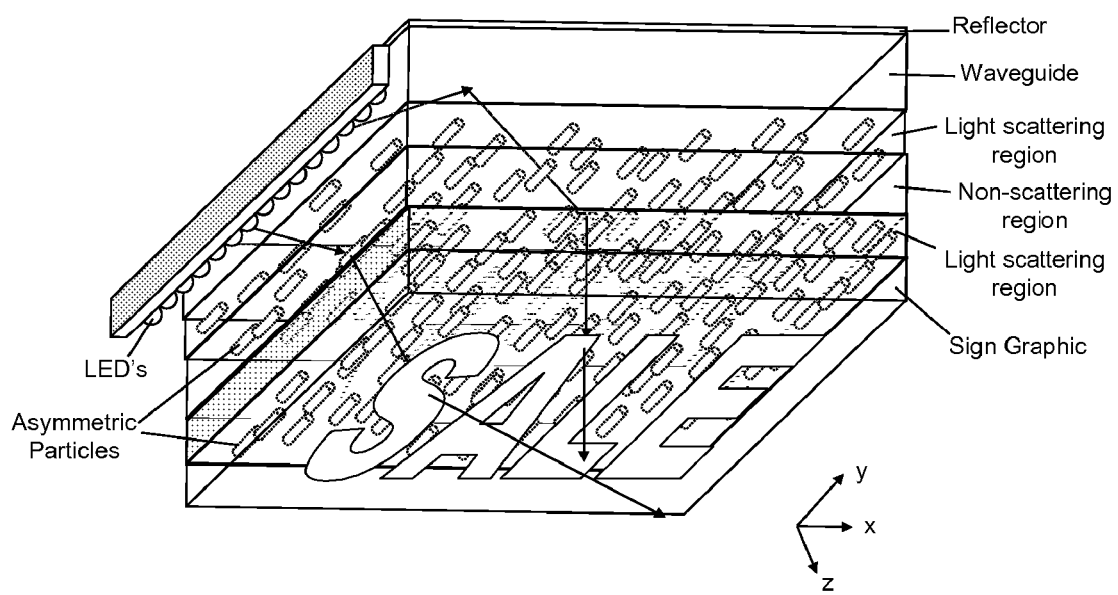
FIG. 14 is a perspective view of an enhanced electroluminescent sign using two volumetric, anisotropically scattering regions spaced apart by a non-scattering region in combination with a waveguide and a linear array of LEDs.

FIG. 14 is a perspective view of another embodiment of an enhanced electroluminescent sign wherein multiple volumetric, anisotropic scattering regions are optically coupled to a waveguide in a sign. A sign graphic is spaced from the waveguide by an air gap. The asymmetric particles in the scattering regions are oriented in the y direction. By using a diffuser containing multiple regions of asymmetric particles optically coupled to the waveguide, the control of the angular spread of light is maintained while the speckle contrast is reduce. The light from a linear array of LEDs is coupled into the waveguide through one edge. Light from the LEDs is reflected by the reflector and totally internally reflects within the waveguide region (composed of the waveguide and the light scattering regions) when the waveguide condition is satisfied. Light that is scattered from the asymmetric particles can be coupled out of the waveguide into the +z and x directions. The light that is scattered in the −z direction can reflect off of the reflector back into the +z direction where it can be scattered again, escape the waveguide region, or reflect off a reflector or other surface if the waveguide condition is satisfied. A portion of the light that is scattered in the +z direction will directly be coupled out of the waveguide. The light that escapes the waveguide region passes through the sign graphic into an anisotropic pattern with a larger FWHM of angular luminance in the x direction than in the y direction.

The signs or elements of the signs described herein can contain additional particles or materials to protect (hardcoats), reduce glare, symmetrically diffuse light (symmetric particles), and provide other protective or optical enhancement such as those known to those in the sign design field. The volumetric, anisotropic diffusers may be made using flexible or rigid materials and may be used with existing signs or combined in a sign package or device. The anisotropic diffusers may be shaped, cut into patterns such as to provide a patterned spatial light luminance.

The different variations in features and designs of the enhanced electroluminescent sign described herein can be envisioned and include, but are not limited to, one or more combinations of the features described below:

1. Sign type: back-lighted; front-lighted; edge-lighted; shaped light-emitting sign; building mounted; free-standing; interior; externally illuminated; internally illuminated; channel letter; copy board; electronic message center; LED sign; wall sign; fascia sign; awning; projecting sign; sign band; roof sign; parapet sign; window sign; canopy sign; pylori sign; joint tenant sign; monument sign; pole sign; high-rise pole sign; directional sign; regulatory sign; mall sign; point-of-purchase sign; low-profile sign; marquee sign; backlit awning; readerboard sign; banner sign; hanging sign; device for displaying information of a legend, message, or indicia thereon;
2. Sign graphic type: transparency; printed vinyl; translucent polymer; glass; shaped light emitting indicia;
3. Sign graphic location: one face; more than one face; along an edge; along at least a portion of one surface;
4. Waveguide type: none; scattering; non-scattering; polymer; glass; colorless; tinted; dyed; curved; planar; parallel faces; non-parallel faces; tapered;
5. Number of scattering regions: one; two; more than two;
6. Scattering region:
    a. Scattering region location: within the waveguide; within a substrate; within a multi-region diffuser; between the reflective element and the waveguide; within a coating on a waveguide; within a film optically coupled to the waveguide; within an adhesive between two elements of an electroluminescent sign; between a light source and the waveguide; in the optical path between a light source and a the sign output surface;
    b. Scattering region thickness: greater than 5 microns and less than 300 mm;
    c. Dispersed domain shape: symmetric; or asymmetric; spherical; non-spherical; or a combination of both; varying through the volume; varying in a pattern; random;
    d. Dispersed domain size: between 1 μm and 30 μm in the minor axis; between 2 μm and 2 cm in the major axis; varying through the volume; varying in a pattern; random; small domain size distribution; large domain size distribution;
    e. Light scattering domain refractive index: average refractive index $n_p$ wherein $|n_p-n_m|>0.001$; refractive index $n_{px}$ and $n_{py}$, in the x and y directions respectively, wherein $|n_{px}-n_m|>0.001$; $|n_{py}-n_m|>0.001$; or $|n_{py}-n_m|>0.001$ and $|n_{px}-n_m|>0.001$.
    f. Light scattering domain concentration: constant; varying throughout the volume; regularly varying; random;
    g. Separation between individual scattering regions: greater 5 microns and less than 300 mm.
    h. Asymmetric domain alignment: x direction; y direction; z direction; at an angle relative to the x, y, or z directions; static; adjustable; automatically aligned; varying spatially;
7. Reflector type: none; metallized coating; multi-layer reflective plastic;
8. Light source type: Fluorescent; cold-cathode fluorescent; compact fluorescent; neon; radiofluorescent; halogen; incandescent; Mercury vapor; sodium vapor; high pressure sodium; metal halide; tungsten; carbon arc; electroluminescent; LED; OLED; laser; photonic bandgap based light source; quantum dot based light source;
9. Number of light sources: one; two; more than two;
10. Individual light source color: primary color; non-primary color; white; cool white; warm white;
11. Light source optics: none, collimating lens; collimating reflector; integrator; refractive lens; reflective lens; anisotropic refracting or scattering element to increase uniformity;
12. Waveguide material: none; polymer; rubber; plastic; glass;
13. Waveguide extraction method: symmetrically diffusing regions; asymmetrically diffusing regions; printed dots; prismatic shapes; surface relief profile;
14. Light re-directing feature: collimating; directing; scattering; refractive; reflective; diffractive; scattering; hybrid; off-axis; on-axis; bead shaped; hemispherical shaped; non-hemispherical; prismatic; linear array of prisms;
15. Prismatic shapes: none; regular array in x direction; regular array in the y direction; regular array in the x and y directions; irregular array; apex angle greater than 90 degrees; apex angle less than 90 degrees;

16. Bulb or tinted region color: none, primary color; non-primary color;
17. Tint location: none; within substrate; within light scattering region(s); within a non-scattering region; a separate film or region;
18. Diffuser substrate type: none; rigid; flexible; substantially transparent; substantially opaque;
19. Substrate location: none; behind the reflector; in-between the light scattering regions; in front of the light scattering regions;
20. Additional coatings or films: none; anti-reflection; UV absorbing; anti-blocking; anti-glare; hardcoat; capping layers (protecting metal layers from oxidation or other compounds such as the adhesive); adhesives; glues; reflective films; tinted films; protective films; graphic films; patterned films; decorative films;

Multi-region diffusers may have other different configurations and are described further in U.S. patent application Ser. No. 11/197,246. Additionally, the enhanced backlights and light fixtures described in U.S. patent application Ser. Nos. 11/223,660 and 60/628,852 can be adapted to function as enhanced electroluminescent signs or displays by combining them with image or indicia forming means. The different configurations and embodiments disclosed in the aforementioned provisional patent applications are included as references and embodiments herein.

Preferred embodiments of the present invention are illustrated in the following Example(s). The following examples are given for the purpose of illustrating the invention, but not for limiting the scope or spirit of the invention.

EXAMPLE 1

An enhanced electroluminescent sign in accordance with the present invention, i.e., as illustrated in FIG. 11, has increased spatial luminance uniformity, increased optical efficiency and is of low production cost. A 16"×20" direct-lit light box sign (UltraThin Light Up Display from Bowman Displays) is used as a benchmark for comparison with the enhanced electroluminescent sign of this invention. The spatial luminance uniformity is measured at 0.5 cm intervals on either side of a region directly above the T8 fluorescent lamp in the white light box with the included standard symmetric diffuser film (Sample STANDARD) with a Minolta CS-100 spectrophotometer. The angular luminance profile is measured at a location directly above a fluorescent bulb with the standard symmetric diffuser film with a Minolta CS-100 luminance and tristimulous spot meter at varying 5 degree angular positions.

Figure 15:
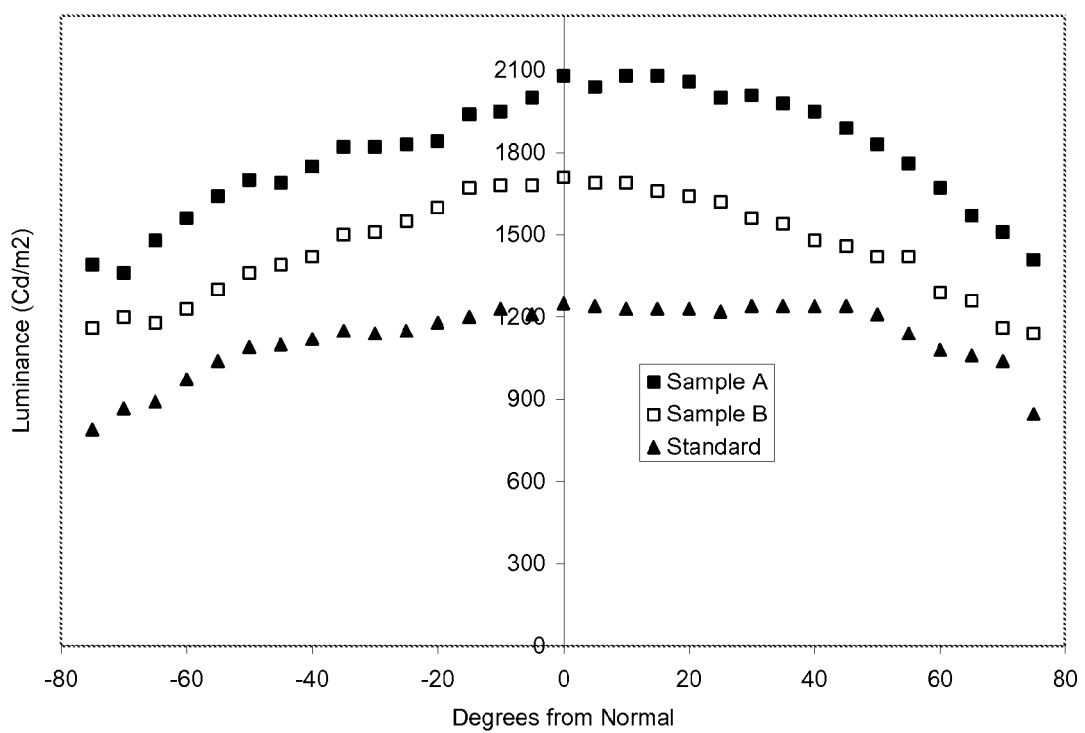
FIG. 15 is a chart of the angular luminance uniformity of the electroluminescent sign using the Standard and Samples A, B, and C.

A light scattering film with anisotropic scattering profile was prepared by blending and extruding a mixture of 70% polyester and 30% polyethylene into a film and stretching the film to achieve asymmetric dispersed phase domains as described in U.S. Pat. No. 5,932,342, the text of which is incorporated herein by reference. The resulting 200 micron film had a full-width half maximum angular luminance profile of 70°×10° upon illumination with collimated light. Sample A was prepared by optically coupling a sheet of the anisotropic light scattering film to the light source side of a 1.5 mm clear polycarbonate sheet such that the major diffusing axis was perpendicular to the linear fluorescent lamps in the sign. Sample B was prepared by optically coupling a sheet of the anisotropic light scattering film to one side of a 1.5 mm clear polycarbonate sheet and optically coupling 2 sheets of the film to the opposite side (viewing side) such that the major diffusing axis of all of the films was perpendicular to the linear fluorescent lamps in the light box. Sample C was prepared by optically coupling 2 sheets of the anisotropic light scattering film to one side of a 1.5 mm clear polycarbonate sheet and optically coupling 2 layers of the film to the opposite side (viewing side) such that the major diffusing axis of all of the films is perpendicular to the linear fluorescent lamps in the light box. The results of the spatial and angular luminance are shown in FIG. 15 and FIG. 16, respectively.

Figure 16:
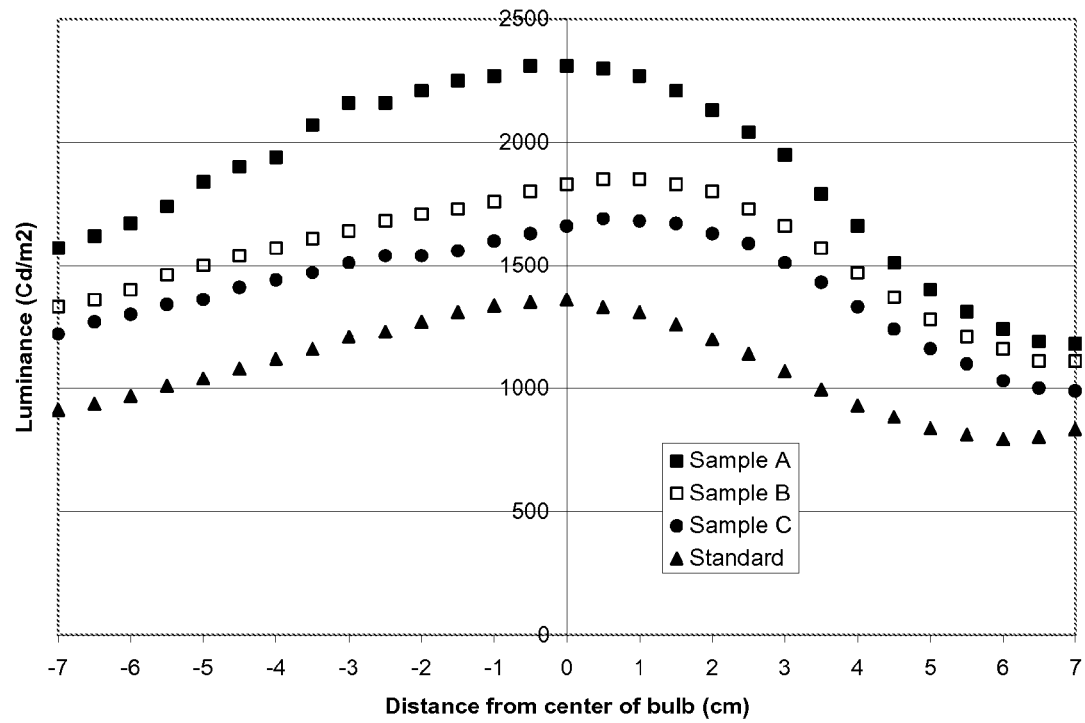
FIG. 16 is a chart of the spatial luminance uniformity of the electroluminescent sign using the Standard and Samples A, B, and C.

The spatial luminance uniformity of the electroluminescent signs using the Standard and Samples A, B, and C is shown in FIG. 16. The maximum luminance of the sign is clearly higher with the Samples A, B, and C over the standard isotropic diffuser and the results are shown in Table 1. This illustrates the increased optical efficiency obtained by using anisotropic light scattering regions. The spatial luminance uniformity can be compared by examining the spatial distance from with center of the bulb (maximum luminance point) at which the luminance falls to 70% of the maximum due to the eyes capability of discerning luminance variations. In the case where no diffuser is used at all, the spatial luminance at 70% would be approximately 5 cm (the width of the T8 fluorescent bulb). The larger the distance to the 70% maximum luminance on either side of the bulb, the more uniform the luminance. The spatial luminance at 70% is calculated from the measured curves of FIG. 16 and is shown in Table 1. All of the samples A, B, and C have larger spatial uniformities than the standard isotropic diffuser, with the multiple layer anisotropic scattering region separated by a non-diffusing polycarbonate substrate (Sample C) providing the most uniformity. The angular luminance distribution is illustrated in FIG. 15. Here, one may also look at the angles at which the luminance falls to a value of 70% that of the maximum luminance. The calculated angular full-width at 70% maximum luminance values are shown in Table 1. The angular distribution of the standard and the Samples A and B are similar in angles with only a minor difference of about 10 degrees over approximately 140 degrees. All are in the range of acceptable viewing angles for most sign applications. Thus, the asymmetric light scattering regions can increase the optical efficiency (higher luminance), increase the spatial luminance uniformity, while essentially maintaining the angular luminance distribution. The resulting increase in efficiency can allow one to use a lower wattage fluorescent bulb to achieve the same luminance as the standard, thus reducing costs.

TABLE 1

|  | Standard | Sample A | Sample B | Sample C |
|---|---|---|---|---|
| Increase in Max. Luminance from Standard | 0% | 70% | 36% | 24% |
| Spatial Uniformity (full width @ 70% max) in cm | 10.5 | 10.75 | 12.5 | 14 |
| Angular Uniformity (full width @ 70% max) in degrees | 142 | 139 | 132 |  |

EXAMPLE 2

An enhanced electroluminescent sign in accordance with the present invention can be produced as described in FIG. 8, that has increased spatial luminance uniformity, increased optical efficiency, reduced speckle and lower costs of production. This is due in part to the use of the volumetric anisotropic scattering region within the waveguide to more efficiently control the light scattering. A light diffusing waveguide containing light scattering particles in a host matrix material is created by extruding, casting or coating, the mixture containing particles. The particle chosen may be a polystyrene bead of diameter 5 µm in the minor axis and 20 µm in the major axis dispersed at 10% concentration in a host matrix of acrylic. Other choices of particles and host matrix may provide equivalent performance. Asymmetry and alignment of the asymmetry can be created by stretching or extrusion processes. The resulting material suitable for waveguiding light contains asymmetric particles and is optically coupled to a reflector such as aluminized Mylar from DuPont by lamination using pressure sensitive adhesive (PSA). A sign graphic such as a screen-printed translucent vinyl material is disposed on the opposite surface of the waveguide. A linear fluorescent bulb is aligned along one edge that is parallel to the alignment of the asymmetric particles. Further common sign components such as those needed to contain the light source, waveguide and the electronics and electrical elements of the sign are attached to create an enhanced electroluminescent sign.

EXAMPLE 3

An enhanced electroluminescent sign, in accordance with the present invention, can be produced as described in FIG. 11, that is designed to have increased spatial luminance uniformity, increased optical efficiency, reduced speckle and lower costs of production. This is due in part to the use of the volumetric anisotropic scattering element more efficiently controls the light scattering. A light diffusing film containing light scattering particles in a host matrix material is created by extruding, casting or coating, the mixture containing particles. The particle chosen may be a polystyrene bead of diameter 5 µm in the minor axis and 20 µm in the major axis dispersed at 10% concentration in a host matrix of acrylic. Other choices of particles and host matrix can provide equivalent performance. Asymmetry and alignment of the asymmetry can be created by stretching or extrusion processes. The resulting film suitable for diffusing light contains asymmetric particles and is placed on the exit face of a white light box containing parallel cylindrical fluorescent bulbs. The axis of alignment of the asymmetric particles is aligned substantially parallel to the fluorescent bulbs as indicated in FIG. 12. The anisotropic diffusing film may be attached to an acrylic substrate using a PSA. A sign graphic such as a screen-printed translucent vinyl material is located between the diffusing film and the outer surface of the sign. The light from the fluorescent bulbs is diffused more in the horizontal directions (perpendicular to the bulbs) than the vertical making efficient utilization of the light and diffusing the "hot spots" of the linear lamps. Further common sign components such as those needed to contain the light source, the electronics and electrical elements of the fixture are attached to create an enhanced electroluminescent sign.

EXAMPLE 4

An enhanced electroluminescent sign, in accordance with the present invention, can be produced as described in FIG. 13, that has increased spatial luminance uniformity, increased optical efficiency, reduced speckle and lower costs of production. This is possible because the volumetric anisotropic scattering element more efficiently controls the light scattering. A light diffusing film containing light scattering particles in a host matrix material is created by extruding, casting or coating, the mixture containing particles. The particle chosen may be a polystyrene bead of diameter 5 µm in the minor axis and 20 µm in the major axis dispersed at 10% concentration in a host matrix of acrylic. Other choices of particles and host matrix may provide equivalent performance. Asymmetry and alignment of the asymmetry can be created by stretching or extrusion processes. The resulting film suitable for diffusing light contains asymmetric particles and in placed on the exit face of a channel letter sign using LEDs as the light source. The axis of alignment of the asymmetric particles is aligned substantially in the vertical direction (y direction as shown in FIG. 13) such that the light is diffused to larger angles in the horizontal direction (x direction). The anisotropic diffusing film may be attached to an acrylic substrate using a PSA. Further common channel letter sign components such as those needed to contain the light source, and the electronics and electrical elements of the fixture are attached to create an enhanced electroluminescent sign.

EXAMPLE 5

An enhanced electroluminescent sign in accordance with the invention can be produced as described in FIG. 14, that is designed to have increased spatial luminance uniformity, increased optical efficiency, reduced speckle and lower costs of production. This is possible because the multiple regions of asymmetric particles optically coupled to the waveguide more efficiently control the light scattering while reducing speckle contrast. A multi-region light diffusing film containing light scattering particles in a host matrix material is created by extruding, casting or coating, the mixture containing particles. In between the light scattering regions is a substantially non-scattering region. The particle chosen may be a polystyrene bead of diameter 5 µm in the minor axis and 20 µm in the major axis dispersed at 10% concentration in a host matrix of acrylic. Other choices of particles and host matrix may provide equivalent performance. Asymmetry and alignment of the asymmetry can be created by stretching or extrusion processes. A portion of the resulting anisotropic scattering multi-region film containing asymmetric particles is optically coupled to a transparent acrylic waveguide by lamination using a PSA. Aluminized Mylar from DuPont is laminated to the face opposite the scattering film using a PSA. A linear array of LEDs such as LXHL-NW99 from Lumileds Lighting Inc. is aligned along one edge that is parallel to the alignment of the asymmetric particles. A sign graphic such as a screen-printed translucent vinyl material is located between the diffusing film and the outer surface of the sign. The light from the LEDs is diffused more in the horizontal directions (perpendicular to the linear array of LEDs) making efficient utilization of the light. The multiple light scattering regions reduce the visibility of speckle, increase the luminance uniformity while maintaining optical efficiency. Further common sign components such as those needed to contain the light source, the electronics and electrical elements of the sign are attached to create an enhanced electroluminescent sign.

Equivalents

Those skilled in the art will recognize, or be able to ascertain using no more than routine experimentation, numerous equivalents to the specific procedures described herein. Such equivalents are considered to be within the scope of the invention. Various substitutions, alterations, and modifications may be made to the invention without departing from the spirit and scope of the invention. Other aspects, advantages, and modifications are within the scope of the invention. The contents of all references, issued patents, and published patent applications cited throughout this application are hereby incorporated by reference. The appropriate components, processes, and methods of those patents, applications and other documents may be selected for the invention and embodiments thereof. Related applications to this are PCT/US05/31276, U.S. patent application Ser. Nos. 11/197,246, 11/223,660, and 60/628,852, the entire contents of which are incorporated herein by reference.

What is claimed is:

1. A light emitting device providing illumination comprising:
    a) a first light emitting surface;
    b) a second light emitting surface opposite the first surface;
    c) at least one light emitting source comprising an array of light emitting diodes;
    d) a first anisotropic backward and forward scattering region disposed in the optical path from the light source to the first light emitting surface comprising a first continuous phase material of refractive index $n_{c1}$ and a first dispersed phase material of refractive index $n_{d1}$ wherein $|n_{c1}-n_{d1}|>0.001$ along a first scattering axis and one or more of the first dispersed phase domains are asymmetric in shape;
wherein the first anisotropic backward and forward scattering region anisotropically scatters light backward toward the second light emitting surface and anisotropically scatters light forward toward the first light emitting surface, the light emitting device emits illuminating light from the first and second light emitting surfaces, and the emitted light from at least one of the light emitting surfaces provides anisotropic illumination.

2. The light emitting device of claim 1 wherein the light emitting device provides anisotropic illumination from the first and second light emitting surfaces.

3. The light emitting device of claim 2 wherein the anisotropic illumination satisfies the condition of $\theta_1 > \theta_2$ where $\theta_1$ is the full angular width at half the maximum intensity measured in a first emitting plane and $\theta_2$ is the full angular width at half the maximum intensity measured in a second emitting plane orthogonal to the first emitting plane.

4. The light emitting device of claim 2 further comprising light extraction features disposed in a pattern such that the first light emitting surface exhibits a spatial luminance uniformity greater than 70%.

5. The light emitting device of claim 4 comprising at least two light sources emitting light of two different colors wherein the perceived color of the first light emitting surface is substantially uniform and comprises the summation of the scattered light contributions from the anisotropic scattering region due to the two sources.

6. The light emitting device of claim 2 further comprising at least one light source selected from the group consisting of fluorescent lamps, cylindrical cold-cathode fluorescent lamp, flat fluorescent lamp, light emitting diode, organic light emitting diode, field emissive lamp, gas discharge lamp, neon lamp, filament lamp, incandescent lamp, electroluminescent lamp, radiofluorescent lamp; halogen lamp; incandescent lamp; mercury vapor lamp; sodium vapor lamp; high pressure sodium lamp; metal halide lamp; tungsten lamp; carbon arc lamp; electroluminescent lamp; laser; photonic bandgap based light source; quantum dot based light source.

7. The light emitting device of claim 6 comprising an array of light emitting diodes.

8. The light emitting device of claim 3 further comprising a second anisotropic light scattering region.

9. The light emitting device of claim 3 further comprising light redirecting surface features disposed in the optical path of the light exiting at least one of the first or second light emitting surfaces.

10. The light emitting device of claim 9 wherein the light redirecting surface feature is a substantially linear array of prismatic structures.

11. The light emitting device of claim 2 wherein the disperse phase material is gaseous.

12. The light emitting device of claim 2 wherein the light emitting device is a substantially planar.

13. The light emitting device of claim 12 further comprising an input coupling surface substantially orthogonal to the first light emitting surface disposed to receive light from at least one of the light sources.

14. The light emitting device of claim 13 wherein the light emitting device provides direct and indirect illumination.

15. The light emitting device of claim 14 wherein the light from the first emitting surface provides anisotropic indirect illumination.

16. A multi-display device comprising:
    a) a first light emitting surface;
    b) a second light emitting surface opposite the first surface;
    c) at least one light emitting source comprising an array of light emitting diodes;
    d) a first anisotropic backward and forward scattering region disposed in the optical path from the light source to the first light emitting surface comprising a first continuous phase material of refractive index $n_{c1}$ and a first dispersed phase material of refractive index $n_{d1}$ wherein $|n_{c1}-n_{d1}|>0.001$ along a first scattering axis and one or more of the first dispersed phase domains are asymmetric in shape;
    e) a first spatial light modulator disposed to receive illumination from the first light emitting surface;
    f) a second spatial light modulator disposed to receive illumination from the second light emitting surface;
wherein the first anisotropic backward and forward scattering region anisotropically scatters light backward toward the second light emitting surface and anisotropically scatters light forward toward the first light emitting surface, and the first and second light emitting surfaces provide anisotropic illumination and have a spatial luminance uniformity greater than 70%.

17. The multi-display device of claim 16 wherein the first and second spatial light modulators are liquid crystal display panels.

18. A substantially planar multi-display device comprising:
    a) a first light emitting surface;
    b) a second light emitting surface opposite the first surface;
    c) at least one light emitting source comprising an array of light emitting diodes;
    d) an input coupling surface substantially orthogonal to the first light emitting surface disposed to receive light from at least one of the light sources;
    e) a first anisotropic backward and forward scattering region disposed in the optical path from the light source to the first light emitting surface comprising a first continuous phase material of refractive index $n_{c1}$ and a first dispersed phase material of refractive index $n_{d1}$ wherein $|n_{c1}-n_{d1}|>0.001$ along a first scattering axis and one or more of the first dispersed phase domains are asymmetric in shape;
    e) a first spatial light modulator disposed to receive illumination from the first light emitting surface;

f) a second spatial light modulator disposed to receive illumination from the second light emitting surface;

wherein the first anisotropic backward and forward scattering region anisotropically scatters light backward toward the second light emitting surface and anisotropically scatters light forward toward the first light emitting surface, and the first and second light emitting surfaces provide anisotropic illumination and have a spatial luminance uniformity greater than 70%.

19. The multi-display of claim 18 wherein the first and second spatial light modulators are liquid crystal display panels.

20. The light emitting device of claim 9 wherein the light redirecting surface feature is a substantially linear array of hemispherical structures.

* * * * *